United States Patent
Sugawara et al.

(10) Patent No.: US 6,785,225 B1
(45) Date of Patent: Aug. 31, 2004

(54) COMMUNICATION APPARATUS AND COMMUNICATION SYSTEM

(75) Inventors: Toshiki Sugawara, Koganei (JP); Noboru Endo, Kodaira (JP); Kenichi Sakamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 599 days.

(21) Appl. No.: 09/588,002

(22) Filed: Jun. 6, 2000

(30) Foreign Application Priority Data

Jun. 9, 1999 (JP) .......................................... 11-162037

(51) Int. Cl.[7] .............................................. H04L 12/26

(52) U.S. Cl. ....................................... 370/225; 370/244

(58) Field of Search ................................ 370/216, 217, 370/218, 219, 220, 221, 222, 223, 224, 225, 226, 227, 228, 408, 539, 541, 241, 242, 244, 250

(56) References Cited

U.S. PATENT DOCUMENTS

| 5,870,382 | A | * | 2/1999 | Tounai et al. ................ 370/220 |
| 6,144,633 | A | * | 11/2000 | Ikeda et al. .................. 370/217 |
| 6,256,291 | B1 | * | 7/2001 | Araki .......................... 370/216 |
| 6,598,092 | B2 | * | 7/2003 | Tomizawa et al. .......... 709/251 |
| 6,616,350 | B1 | * | 9/2003 | de Boer et al. ................ 398/9 |
| 6,639,893 | B1 | * | 10/2003 | Chikenji et al. ............ 370/217 |

* cited by examiner

Primary Examiner—Kwang Bin Yao
(74) Attorney, Agent, or Firm—Antonelli, Terry, Stout & Kraus, LLP

(57) ABSTRACT

A communication system including two layers, each having a switching function. The two layers includes lower-layer apparatuses which are connected with communication lines of a lower layer and communication lines of an upper layer and upper-layer apparatuses which are connected with the communication lines of the upper layer. Line failure in the lower and upper communication lines is detected and line switching is coordinated by the line-switching function of the lower and upper-layer apparatuses by using failure information on the lower and upper-layer communication lines.

6 Claims, 19 Drawing Sheets

COMMUNICATION APPARATUS AND COMMUNICATION SYSTEM

BACKGROUND OF THE INVENTION

1. Field of the Invention

The present invention relates to a communication apparatus and a communication system.

2. Description of the Related Art

Data communication has recently become more and more important with the spreading Internet, etc. as its background. ATM networks in accordance with ITU-T 1.150 have been introduced in this field to integrate telephony and data communication. High-speed optical communication network technologies such as SONET defined by ANSI T1.105, SDH defined by ITU-T G.707, and OTN defined by ITU-T G.872 have been introduced in this field. SONET and SDH have basically the same function, and OTN, an optical network, is based on the WDM (Wavelength Division Multiplexing) technology to raise the transmission capacity in a fiber.

These networks are interconnected by prescribing upper and lower layers based on the layer hierarchy of the OSI (Open System Interconnection) reference model defined by ISO. According to the provisions of these individual networks, ATM is ranked at the top; OTN, at the bottom; SONET and SDH, at the middle. Each network is also of hierarchic structure, consisting of subnetworks. For example, an ATM network consists of a virtual path and a virtual channel, and SONET/SDH and OTN are of hierarchic structures, consisting of subnetworks, as well.

SUMMARY OF THE INVENTION

Table 1 shows the relations between such upper and lower layers as relate to switching in the above subnetworks, segments defined by repeaters excluded.

FIG. 1 shows the relation between defined segments and multiplexing in a lower and an upper layer. Numerals 100–102 and 110–112 indicate apparatuses in the upper layer; 300 and 310, apparatuses in the lower layer; 500–502, communication lines in the upper layer; 600, a communication line in the lower layer.

In FIG. 1, a plurality of upper-layer apparatuses is connected to a lower-layer apparatus. The upper-layer apparatuses 100–102 are connected to the lower-layer apparatus 300 through the upper-layer communication lines 500–502. The upper-layer apparatuses 110–112 are connected to the lower-layer apparatus 310 through the upper-layer communication lines 500–502. The lower-layer apparatuses bundle the upper-layer communication lines by TDM (Time Division Multiplexing) of SONET of ANSI T1.105 or SDH of ITU-T G.707 or by WDM of OTN of ITU-T G.872 so as to raise the data transmission capacity per physical medium or unit time and transmit data through the lower-layer communication line.

The upper-layer apparatuses 100 and 110 process the overhead portions of SONET or SDH signals when they transmit and receive the signals through the upper-layer communication line 500, the overhead portions containing the administration control signals of the upper-layer communication line. The upper-layer apparatuses 101 and 111, and 102 and 112 carry out the same processing for the upper-layer communication lines 501 and 502, respectively. The segment for processing the administration control signals of the upper-layer communication line is called upper-layer communication-line segment (hereinafter "upper-layer segment"). The upper-layer communication lines 500–502 may be three physically separate lines or such a physically single line comprising three separate logical lines as the bus of SONET or SDH. In the same way, the lower-layer communication line 600 is terminated by the lower-layer apparatuses 300 and 310, and the segment between the apparatuses is called the lower-layer communication-line segment (hereinafter "lower-layer segment").

In this way, signals of the upper layer are multiplexed to become signals of the lower layers.

Accordingly, the signals of the upper layer may become equal to but never become larger than the signals of the lower layer in terms of the signal band. The defined segments of the upper layer may be equal to but never shorter than the defined segment of the lower layer.

FIG. 2 shows a case wherein each of the upper and lower layers has protection-switching processing parts. Upper-layer communication lines 500 to 505 are terminated by upper-layer apparatuses 100–104 and signal processing parts 120–124 and 125–129 in the apparatuses 100–104. Multiplexing/demultiplexing parts 440 and 450 in lower-layer apparatuses 300 and 310 multiplex and demultiplex the upper-layer communication lines 500–503, which, going through the lower-layer segment of the lower-layer communication line 600 or 601, connect the upper-layer apparatuses 100–103 with those 110–113. In the same way, multiplexing/demultiplexing units 441 and 451 in lower-layer apparatuses 301 and 311 multiplex and demultiplex the upper-layer communication lines 504–505, which, going through the lower-layer segment of the lower-layer communication line 602 or 603, connect the upper-layer apparatuses 103 and 104 with those 113 and 114.

For the sake of simplification of description, a protection switching system of the 1+1 type will be taken as an example and its description will follow. The system comprises a set of a working communication line and a protection line. While the system is operating normally, the same data are transmitted through both the working and protection lines and the receiving side chooses a line of which the transmission quality is better than that of the other. In FIG. 2, a lower-layer communication-line bridge/selector part 420 or 430 on the transmitting side transmits the same data through both the working and protection lower-layer communication lines 600 and 601. In the same way, a lower-layer communication-line bridge/selector part 421 or 431 on the transmitting side transmits the same data through both the working and protection lines 602 and 603. While all the communication lines and all the apparatuses are normal, the lower-layer communication-line bridge/selector part 430 or 420 on the receiving side chooses the working line 600. When the working line 600 goes out of service due to some failure, the lower-layer communication-line bridge/selector part 430 or 420 on the receiving side chooses the protection line 601 to restore the communication line in the lower layer. In the same way, while all the communication lines and all the apparatuses are normal, the lower-layer communication-line bridge/selector part 431 or 421 on the receiving side chooses the working line 602. When the working line 602 goes out of service due to some failure, the lower-layer communication-line bridge/selector part 431 or 421 on the receiving side chooses the protection line 603 to restore the communication line in the lower layer.

As in the case of the lower-layer communication lines, an upper-layer communication-line bridge/selector part 220 or 230 on the transmission side transmits the same data through both the working and protection upper-layer communication lines 503 and 504. While all the lines and all the apparatuses are normal, the upper-layer communication-line bridge/selector part 230 or 220 on the receiving side chooses the working line 503. When the working line 503 goes out of service, the upper-layer communication-line bridge/selector part 230 or 220 on the receiving side chooses the protection line 504 to restore the communication line.

Describe below is the switching processing in the upper and lower layers upon the occurrence of failure in the lower-layer communication line 600 as shown in FIG. 3. The switching method was devised to describe the embodiments of the present invention. FIG. 3 shows a portion including the protection-switching processing parts of FIG. 2. In this method, when failure has occurred in the lower layer, an alarm indication signal (AIS) is sent to the upper-layer apparatuses. FIG. 4 shows the concept of AIS. As shown in FIG. 4, upper-layer communication lines 500–502 are terminated by upper-layer apparatuses 100–102 and 110–112. Lower-layer apparatuses 300 and 310 connect the upper and lower layers, and the lower-layer apparatuses 300 and 310 are connected to each other by a lower-layer communication line 600. Now it is assumed that failure has occurred in the lower-layer communication line 600. In FIG. 4, signals transmitted in both directions of the lower-layer communication line 600 are shown. Now a case wherein the failure has effects in both directions is considered. At first, each of the lower-layer apparatuses 300 and 310 detects the failure in the lower-layer communication line 600 and sends out an AIS through all the upper-layer communication lines 500–502. Accordingly, all the upper-layer apparatuses 100–102 and 110–112 connected to the lower-layer apparatuses recognize that failure occurred in the lower-layer communication line 600 and the data transmitted through the upper-layer communication lines 500–502 are invalid. The AIS is prescribed in each layer of each network shown in Table 1; i.e., the virtual path and the virtual channel of the ATM network, the path and the line of the SONET, the path and the M section of the SDH network, the optical channel and the optical multiple section of the OTN network, and so on. The provisions of each network prescribe the AIS from the lower layer to the upper layer in each network in accordance with Table 1. Internetwork AIS is also prescribed. For instance, ITU-T 1.610 prescribes the AIS for the case wherein the lower layer is a SONET and the upper layer is an ATM network.

FIG. 5 is a conceptual illustration of the AIS from a lower layer to an upper layer. The line connecting the upper layer and the lower layer is the upper-layer communication line, and the line connecting the two lower-layer apparatuses of the lower layer is the lower-layer communication line. AIS is made from the lower layer to the upper layer but not from the upper layer to the lower layer.

With this AIS system, the upper layer can recognize the failure which has occurred in the lower layer. In this method, the protection-switching processing part of each of the upper and lower layers have independent protocol and determines independently whether to switch the communication line or not based on failure information detected or an AIS received, as the case may be. When failure has occurred in the-lower-layer communication line 600 of FIG. 3, the lower-layer apparatuses 300 and 310 detect the failure and begin the switching processing to switch the communication line from the working line 600 to the protection line 601 in the lower layer. On the other hand, the upper-layer apparatuses 100 and 110 begin the switching processing upon their receipt of an AIS to switch the communication line from the working line 503 to the protection line 504 in the upper layer. In this way, line switching takes place in both the lower and upper layers even when line switching is required in only one layer for the restoration of a failed line. To prevent such unnecessary line switching, either the lower-layer switching function or the upper-layer switching function may be disenabled permanently. For example, ANSI T1.105 prescribes NUT (Non-preemptible Unprotected Traffic) to prohibit line switching path by path of SONET apparatuses, assuming that a SONET apparatus is connected to a network with a switching function such as an ATM network, the former constituting the lower layer and the latter constituting the upper layer.

Another shortcoming anticipated with the system wherein switching is made in both the upper and lower layers is that while the lower-layer apparatuses are switching the communication line, the upper-layer apparatuses may not correctly send and receive the switching protocol between them. One method of coping with this problem would be to stop the switching processing in either of the two layers for a prescribed time period. For instance, ITU-T I.630 prescribes the hold-off time for the system consisting of an ATM network and a SONET or SDH network. While the SONET or SDH network constituting the lower layer is switching the communication line, the switching processing of the ATM network constituting the upper layer is stopped for the hold-off time, of which the range and increment are 0–10 seconds and 500 msec.

As described above, a loss occurs in the switching time because the switching in one of the two layers has to be stopped permanently or for a prescribed time period in case of a system consisting of a lower layer and an upper layer, each having a line-switching function. In the case of the NUT method of ANSI T1.105, the protection-switching processing parts of a SONET become useless because the switching in the network is stopped. On the other hand, according to the method of ITU-T I.630, there occurs a waiting time of at least 500 msec in case that failure which cannot be dealt with in a SONET is to be dealt with in an ATM network. FIG. 7 is the time chart of this method. When failure occurs in the lower layer, the lower-layer apparatuses detect it and send out an AIS through all the upper-layer communication lines. Accordingly, the upper-layer apparatuses connected with the lower-layer apparatuses recognize that failure occurred in the lower-layer communication line and the data transmitted through the upper-layer communication lines are invalid. However, because a hold-off time is set in the upper-layer apparatuses to prevent unnecessary switching as described above, the upper-layer apparatuses do not begin the switching processing during the hold-off time. In FIG. 7, it is assumed that the upper layer is an-ATM network, the lower layer is a SONET or SDH network, and the hold-off time is 500 msec.

The lower-layer apparatuses send out the AIS to the upper layer and, at the same time, begin to switch the communication line. Because the protection switching system is of a 1+1 type, the receiving apparatuses that detected the failure in the communication line have their bridge/selector parts switch the communication line from the working line to the protection line. In the case of SONET, it is prescribed that the time necessary for the line switching should be 50 msec or less. If the protection line also has trouble or the bridge/selector apparatuses do not function correctly due to trouble of an apparatus, the line switching in the lower layer cannot be made. Namely, the lower-layer receiving apparatuses keep detecting the failure in the lower-layer communication line and sending out the AIS through the upper-layer communication lines. But, the upper-layer apparatuses continue standing by until the hold-off time passes. Then, the upper-layer apparatuses carry out the switching processing. Namely, the upper-layer receiving apparatuses have their bridge/selector parts switch the communication line from the working line to the protection line in the upper layer. In the case of ATM, the target value of the switching time of 50 msec is prescribed in ITU-T Draft New Recommendation I.630. After the line switching has been made successfully, the upper-layer apparatuses can receive data through the protection line without detecting failure or receiving an AIS. As shown in FIG. 7, SONET switches the communication line within 50 msec. However, the difference of 450 msec between the hold-off time of 500 msec and the SONET switching time of 50 msec are wasted because action is taken in neither the upper nor the lower layer.

The object of the embodiments of the present invention is to achieve interlayer-coordinated communication-line switching in a communication system or network comprising two layers, each having a switching function. In the interlayer-coordinated communication-line switching, the features of the two switching functions are utilized according to the line conditions so that the interlayer-coordinated communication-line switching can be made in a shorter time and is more efficient and reliable than the switching in accordance with the prior art.

An embodiment of the present invention is as follows, and part of the configuration of the embodiment is shown in FIG. 21. A communication system wherein (1) provided are a first and a second upper-layer apparatus and a first, a second, a third, and a fourth lower-layer apparatus, each apparatus having line-switching means, (2) (i) the first and second upper-layer apparatuses are connected to each other through a first and a second upper-layer communication line between which communication can be switched, (ii) the first and second lower-layer apparatuses are connected to each other through a first and a second lower-layer communication line between which communication can be switched, each lower-layer communication line being multiplexed to accommodate one or more upper-layer communication lines, (iii) the third and fourth lower-layer apparatuses are connected to each other through a third and a fourth lower-layer communication line between which communication can be switched, each lower-layer communication line being multiplexed to accommodate one or more upper-layer communication lines, (iv) the first upper-layer communication line connects the first upper-layer apparatus with the first lower-layer apparatus and the second upper-layer apparatus with the second lower-layer apparatus, and (v) the second upper-layer communication line connects the first upper-layer apparatus with the third lower-layer apparatus and the second upper-layer apparatus with the fourth lower-layer apparatus, (3) a switching-inhibit notification is transmitted to the upper-layer apparatuses when the lower-layer apparatuses have detected line failure, (4) one or more faulty lines of the lower or the upper layer are identified and the site of occurrence of failure is located by using failure information on the lower- and upper-layer communication lines, (5) the switching-inhibit signal to the upper-layer apparatuses is cancelled when no lower-layer communication line has been found faulty but any of the upper-layer communication lines has been found faulty, (6) which line-switching means of the lower- and upper-layer apparatuses should make switching is determined, based on failure information on the lower- and upper-layer communication lines, in order to secure a largest number of normal upper-layer communication lines, or in order to restore high-priority lines rather than low-priority lines, or in order to secure a largest number of signal channels, in case that any of the lower-layer communication lines has been found faulty, and (7) provided is a first means for causing line switching in the lower layer first and then canceling the switching-inhibit signal to the upper-layer apparatuses, in case that switching is to take place in both the lower and upper layers in accordance with said determination.

DESCRIPTION OF THE PREFERRED EMBODIMENTS

First Embodiment

Figure 8:
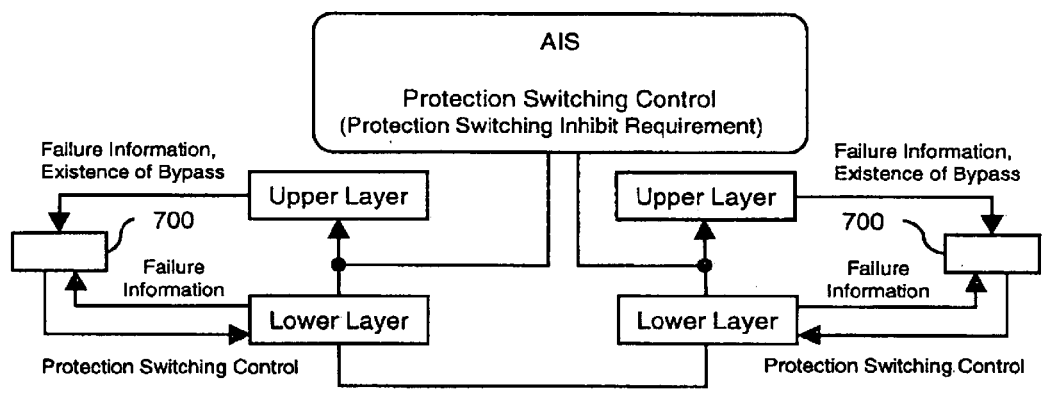
FIG. 8 is a schematic block diagram for describing an embodiment of the present invention, and shown in this figure is the concept of switching processing in the lower and upper layers.

First described is a switching system having a coordinated-switching decision part in accordance with the first embodiment of the present invention. FIG. 8 is a conceptual illustration of the switching device.

In this embodiment, a decision part for coordinated switching is provided. The decision parts receive failure information from an upper and a lower layer and determine in which layer to make switching in accordance with failure conditions. Besides, the decision parts are constructed so as to receive information on whether each upper-layer apparatus has a bypass, namely, another route going round the lower-layer apparatuses which are about to make switching. The lower layer sends the upper layer a switching-inhibit signal in addition to an alarm indication signal (AIS). By sending out the switching-inhibit signal to the upper layer, the switching in the lower layer can be made before that in the upper layer.

Figure 5:
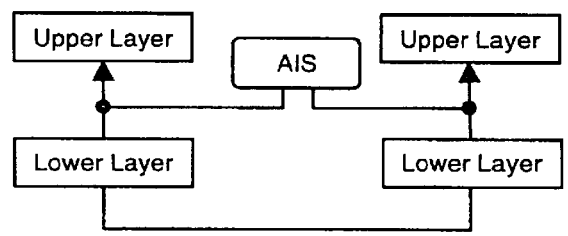
FIG. 5 is a schematic block diagram for describing an example for comparison with the embodiments of the present invention and particularly for describing the concept of an AIS system between the lower and upper layers.
Figure 6:
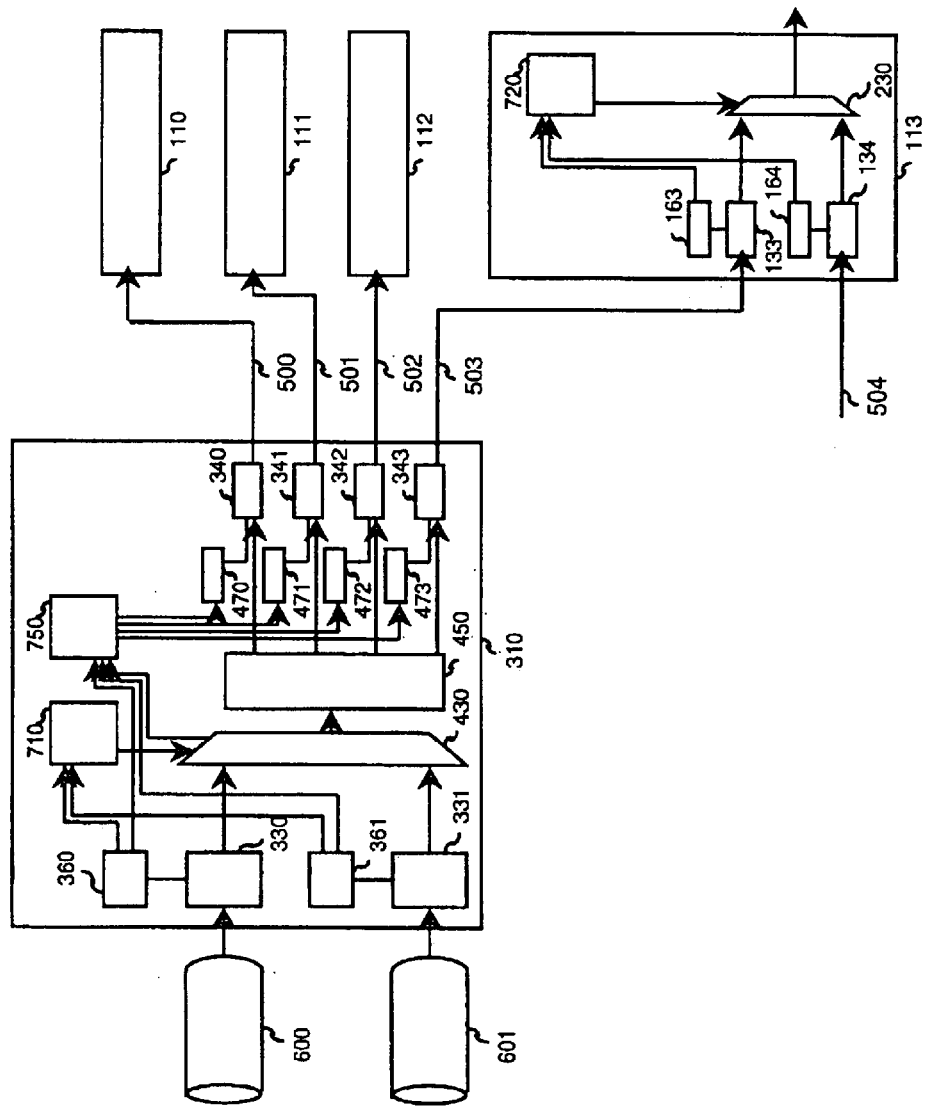
FIG. 6 is a block diagram for describing an example for comparison with the embodiments of the present invention, and the configuration of the switching apparatuses in the lower and upper layers of the example is shown.

Before describing the switching system according to the first embodiment of the present invention, a comparative example will be described with reference to FIG. 5. FIG. 6 shows the details of a part of the network of FIG. 2 in case that the network is constructed of conventional lower- and upper-layer apparatuses.

In FIG. 6, a lower-layer apparatus 310 is connected with another lower-layer apparatus through a working lower-layer communication line 600 and a protection lower-layer communication line 601. The lower-layer apparatus 310 is also connected with upper-layer apparatuses 110–113 through upper-layer communication lines 500–503. The upper-layer apparatus 113 has a protection upper-layer communication line 504 and is connected with another lower- or upper-layer apparatus through the protection line 504. The same data as the working upper-layer communication line 503 can be transmitted through the protection upper-layer communication line 504 as the occasion demands.

Now, the system will be described, assuming that signals are flowing through the lower-layer communication lines 600 and 601 and the upper-layer communication lines 500–504 from the left-hand side to the right-hand side in FIG. 6. The system with signals flowing in the opposite direction can be explained in the same way as mentioned later.

The lower-layer apparatus 310 comprises lower-layer communication-line signal-receiver parts 330 and 331, lower-layer communication-line failure-detecting parts 360 and 361, a lower-layer communication-line bridge/selector part 430, a lower-layer communication-line multiplexing/demultiplexing part 450, a lower-layer communication-line switching-decision part 710, an AIS-transmission decision part 750 for sending an AIS to the upper layer, signal-transceiver parts 340–343 for sending out signals through the upper-layer communication lines, and AIS transmission parts 470–473 for sending out an AIS to the upper layer. The upper-layer apparatus 113 comprises upper-layer communication-line signal-receiver parts 133 and 134, upper-layer communication-line failure-detecting parts 163 and 164, an upper-layer communication-line bridge/selector part 230, and an upper-layer communication-line switching-decision part 720.

Now it is assumed that failure occurred in the lower-layer communication line 600. The lower-layer communication-line failure-detecting part 360 detects the failure and sends a failure signal to the lower-layer communication-line switching-decision part 710 and the AIS-transmission decision part 750. Failure is detected by using an error-detecting system of LOS (Loss of Signal) or BIP (Byte Interleaved Parity) in the case of SONET or SDH. CRC (Cyclic Redundancy Check) is used in case of ATM. AIS is transmitted by using the format defined by ANSI T1.105 or ITU-T G.707 in case of SONET or SDH. OAM cells defined by ITU-T I.610 are used in the case of ATM.

The AIS-transmission decision part 750 instructs the AIS transmission parts 470–473 to send out an AIS through all the upper-layer communication lines 500–503. The lower-layer communication-line switching-decision part 710 exchanges the switching protocol with its opposite lower-layer apparatus to switch the communication line to the protection lower-layer communication line 601. Although the switching system shown in FIG. 6 is of a 1+1 type, switching protocol of the 1+1 type, the 1:N type, and BLSR (Bidirectional Line Switched Ring) defined by ANSI T1.105 are available. The system will be described based on a 1+1 type for the sake of simplification. In a system of a 1+1 type, the receiving apparatuses, which have detected failure in the working communication line, have their bridge/selector part switch the communication line to the protection communication line. Namely, based on the information from the lower-layer communication-line failure-detecting parts 360 and 361, the lower-layer communication-line switching-decision part 710 instructs the lower-layer communication-line bridge/selector part 430 to choose normal one between the working and protection lower-layer communication lines 600 and 601. When the switching in the lower layer has made correctly, the lower-layer communication-line bridge/selector part 430 informs the AIS-transmission decision part 750 that switching in the upper layer is unnecessary, namely, that the AIS transmission to the upper-layer apparatuses is no longer necessary. When the AIS-transmission decision part 750 determines that the switching has been made correctly by the lower-layer apparatuses and the transmission of the AIS, is no longer necessary, it instructs the AIS transmission parts 470–473 to stop sending the alarm to the upper layer. Besides, the AIS-transmission decision part 750 receives the failure information from both the lower-layer communication-line failure-detecting parts 360 and 361 and determines whether the line chosen by the lower-layer communication-line bridge/selector part 430 is correct or not. If there is inconsistency between the failure information on the two communication lines and the processing of the bridge/selector part, the AIS-transmission decision part 750 instructs the AIS transmission parts 470–473 to continue sending the AIS to the upper layer.

The upper-layer apparatuses 110–113 receive the AIS through the upper-layer communication lines 500–503 and carry out independently the switching processing of the upper-layer communication lines in accordance with the switching protocol of the upper layer.

Taking the upper-layer apparatus 113 as an example, the switching processing by the upper layer apparatuses will be described. The upper-layer communication-line failure-detecting parts 163 and 164 detect the AIS coming through the upper-layer communication line 503, determine that the data transmitted through the upper-layer communication line 503 are invalid, and inform the upper-layer communication-line switching-decision part 720. The upper-layer communication-line switching-decision part 720 exchanges the switching protocol with the opposite upper-layer apparatus to switch the communication line to the protection upper-layer communication line 504. Several types of switching protocol are available. For ATM, switching protocol of a 1+1 type is defined by the ITU-T Draft New Recommendation I.630.

If the upper-layer communication-line failure-detecting parts 163 and 164 detect failure in the upper-layer communication line 503 instead of an AIS coming through the upper-layer communication line 503, the upper-layer communication-line switching-decision part 720 exchanges the switching protocol with the opposite apparatus to switch the communication line to the protection upper-layer communication line 504.

Although omitted in FIG. 6, the upper-layer apparatus 113 may have a signal-transceiver part for processing and sending signals to a further upper layer, and an AIS-transmission decision part and an AIS transmission part for transmitting an AIS to the further upper layer.

Figure 9:
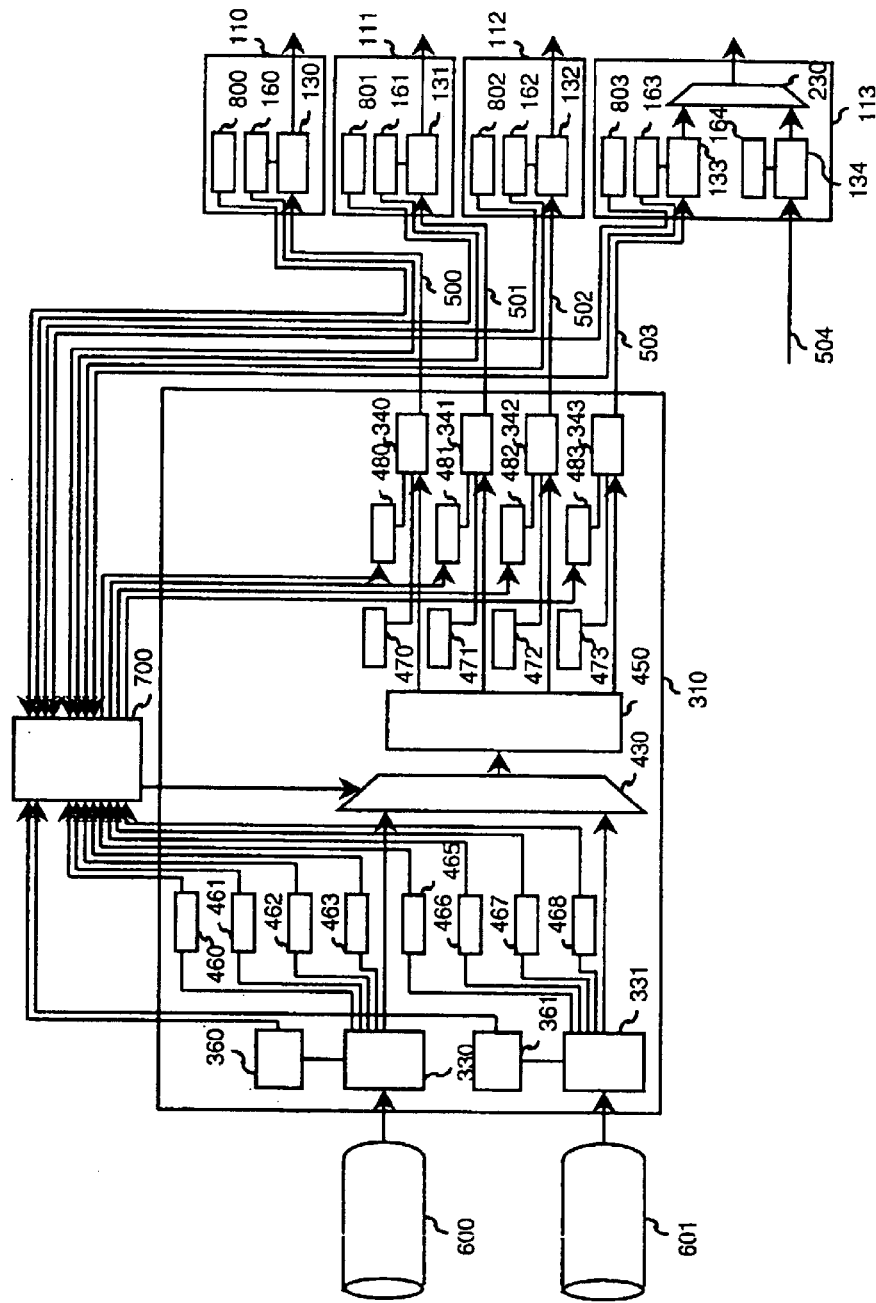
FIG. 9 is a block diagram for describing the embodiment of FIG. 8 and shows the configuration of the switching system with a coordinated-switching decision part.

Referring to FIG. 9, the first embodiment of switching device including a coordinated-switching decision part of the present invention will be described in detail. FIG. 9 shows the details of a part of the network of FIG. 2 in case that the network is constructed of the above lower- and upper-layer apparatuses.

The lower and upper layers in the embodiments of the present invention are applicable to any of ATM, SONET, SDH, and OTN which constitute a hierarchic correlation shown in Table 1. They are also applicable to any of the virtual path, the virtual channel, the path, and the line of subnetworks of ATM, SONET, and SDH. The idea, or design, in the embodiments of the present invention is applicable to any system which has a hierarchic correlation in accordance with the layer hierarchy of the OSI (Open System Interconnection) reference model defined by ISO.

Figure 1A:
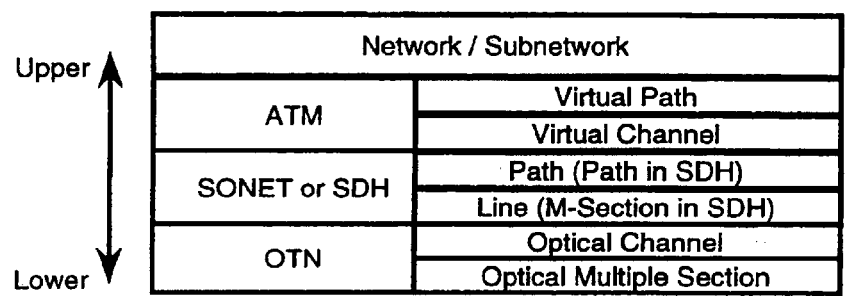
FIG. 1 is an illustration for describing the embodiments of the present invention, and the concept of a lower-layer communication-line segment and upper-layer communication-line segments is shown.
Figure 1B:
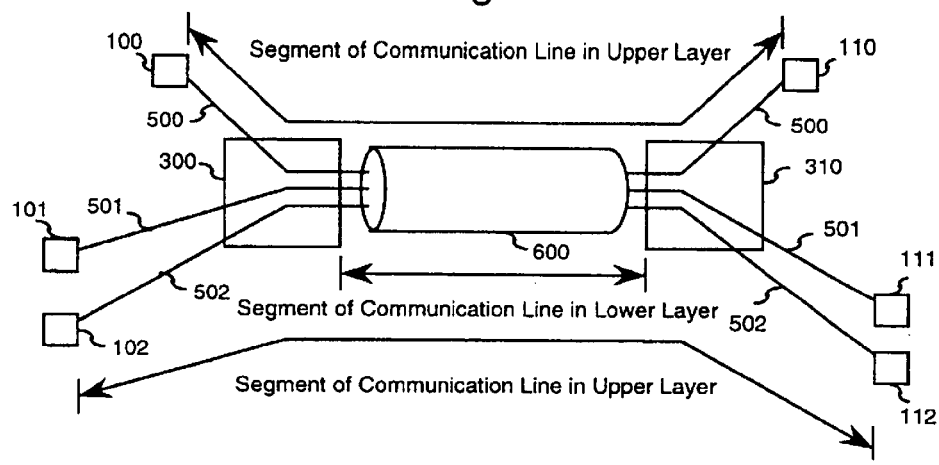
Figure 4:
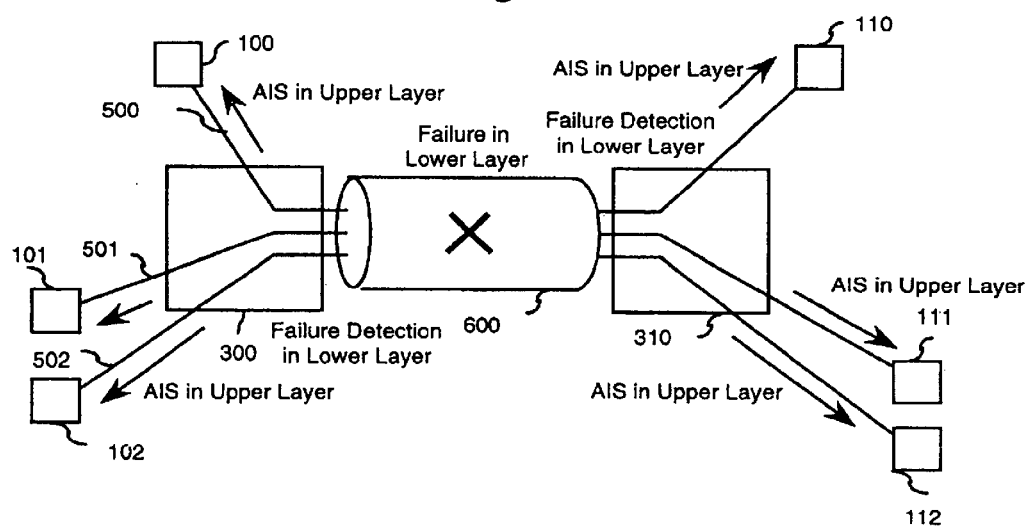
FIG. 4 is a block diagram for describing an example for comparison with the embodiments of the present invention and particularly for describing the transmission of an AIS from the lower layer to the upper layer.
Figure 2:
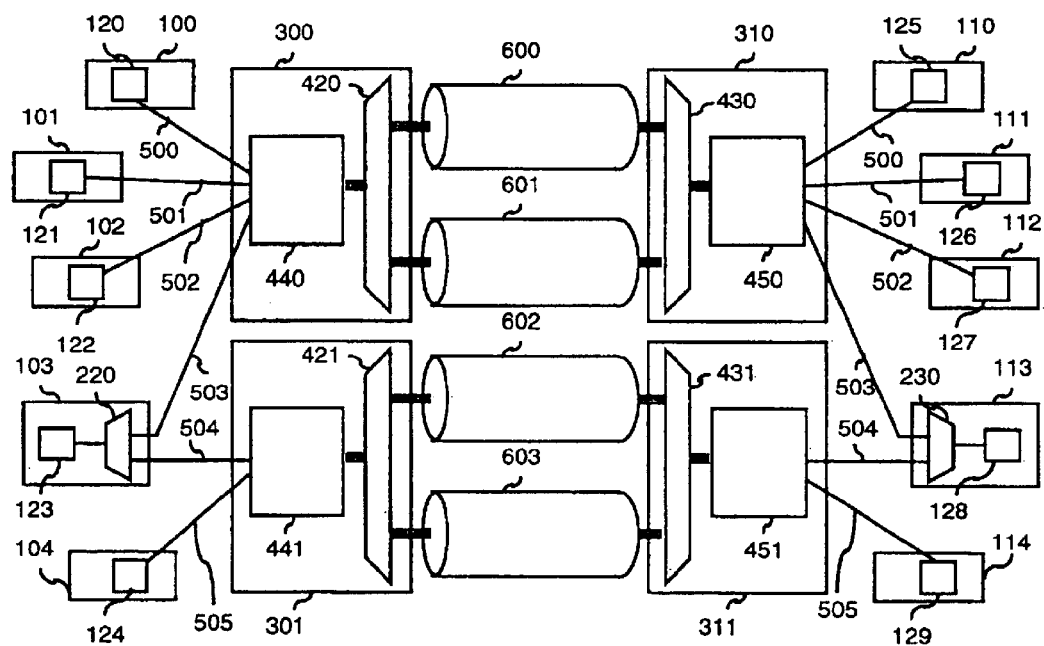
FIG. 2 is a block diagram for describing the embodiments of the present invention, and shown in this figure is the configuration of a network comprising two layers, each having switching parts.
Figure 3:
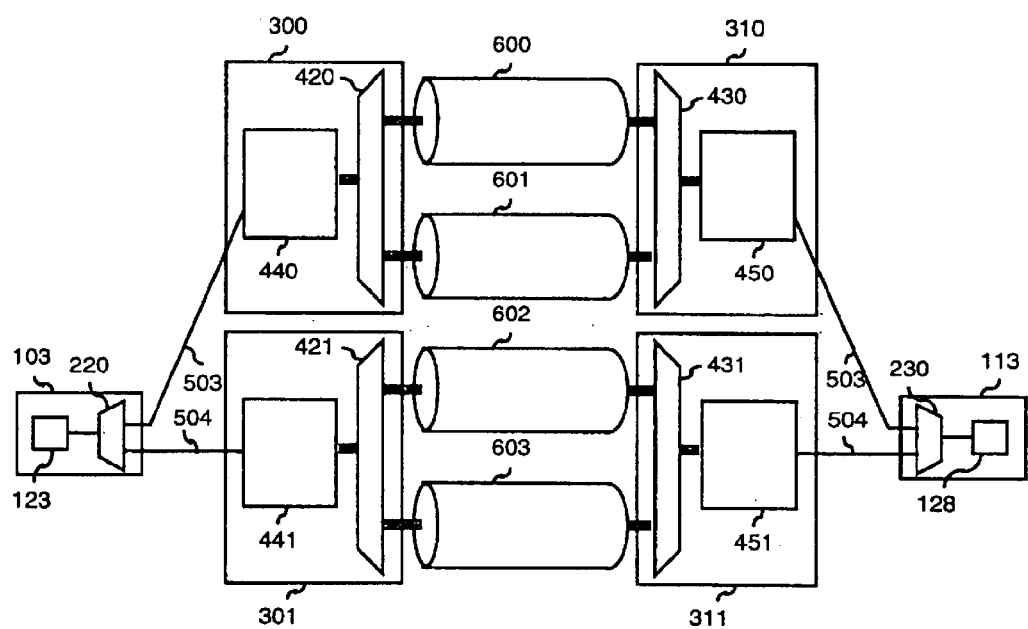
FIG. 3 is a block diagram for describing the embodiments of the present invention and particularly for describing the switching processing in the lower and upper layers in the case of occurrence of failure in a lower-layer communication-line segment.

The lower-layer apparatus 310 of FIG. 9 is connected with another lower-layer apparatus through the working and protection lower-layer communication lines 600 and 601. The switching system of FIG. 9 is of a 1+1 type having a set of a working line and a protection line, through which the same data are transmitted while the conditions of the communication lines are normal. However, the embodiments of the present invention are applicable to a system having switching protocol of a 1:N type, the system having a number ("N") of working lines and a single protection line. Besides, although a linear-type network is shown in FIG. 2, the idea, or design, in the embodiments of the present invention is similarly applicable to ring-type networks and mesh-type networks. Description of a network with the protocol of a 1+1 linear type will follow.

The lower-layer apparatus 310 is also connected with the upper-layer apparatuses 110–113 through the upper-layer communication lines 500–503. The upper-layer apparatus 113 has a protection upper-layer communication line 504, which connects the upper-layer apparatus 113 with another lower-of upper-layer apparatus. The same data as the upper-layer communication line 503 can be transmitted through the protection upper-layer communication line 504 as the occasion demands.

Now, the system will be described, assuming that signals are flowing from the left-hand side to the right-hand side in FIG. 9. The system with signals flowing in the opposite direction can be explained in the same way as mentioned later.

As in the case of the lower-layer apparatus 310 of FIG. 6, the lower-layer apparatus 310 of FIG. 9 comprises lower-layer communication-line signal-receiver parts 330 and 331, lower-layer communication-line failure-detecting parts 360 and 361, a lower-layer communication-line bridge/selector part 430, a lower-layer communication-line multiplexing/demultiplexing part 450, a lower-layer communication-line switching-decision part 710, an AIS-transmission decision part 750 for determining whether or not to send an AIS to the upper layer, signal transceiver parts 340–343 for sending out signals through the upper-layer communication lines 500–503, and AIS transmission parts 470–473 for sending out an AIS to the upper layer. However, the lower-layer communication-line switching-decision part 710 and the AIS-transmission decision part 750 are not shown in FIG. 9. The lower-layer apparatus 310 further comprises upper-layer communication-line failure-detecting parts 460–463 for the working lower-layer communication line 600, upper-layer communication-line failure-detecting parts 465–468 for the protection lower-layer communication line 601, and switching-inhibit-signal transmission parts 480–483 for sending out switching-inhibit signals to the upper layer. These additional features are not included in conventional systems.

The switching-inhibit signal may be transmitted through optical supervisory channel by using the different wavelength from the signals in the case of OTN, by using the overhead in the case of SONET or SDH, and by using the OAM (Operation Administration Maintenance) cell in the case of ATM, etc.

As in the case of conventional apparatuses, the upper-layer apparatus 113 of FIG. 9 comprises upper-layer communication-line signal-receiver parts 133 and 134, upper-layer communication-line failure-detecting parts 163 and 164, an upper-layer communication-line bridge/selector part 230, and an upper-layer communication-line switching-decision part 720. However, the upper-layer communication-line switching-decision part 720 is not shown in FIG. 9.

As in the case of the upper-layer apparatus 113, the upper-layer apparatuses 110–112 have upper-layer communication-line signal-receiver parts 130–132 and upper-layer communication-line failure-detecting parts 160–162.

The upper-layer apparatus 113 further comprises a bypass-information-signal transmission part 803, which conventional systems do not have. In the same way, the upper-layer apparatuses 110–112 have bypass-information-signal transmission parts 800–802.

The bypass-information signal may be transmitted by using the wavelength-multiplexed supervisory signal in the case of OTN, by using the overhead in the case of SONET or SDH, and by using the OAM (Operation Administration Maintenance) cell, etc. in the case of ATM.

The bypass means a usable upper-layer communication line which goes through a lower-layer apparatus other than the lower-layer apparatus 310. Whether there is a bypass or not for each upper-layer communication line can be determined based upon the information on the network given by the operator or the information on line failure from the upper-layer communication-line failure-detecting part. One simple method of determining whether each upper-layer communication line has a bypass or not is as follows. When the operator designs a network, the operator grasps whether each upper-layer communication line has a bypass or not and input the bypass information into the bypass-information-signal transmission part so that it can transmit the bypass information to the lower-layer apparatus. Another simple method is as follows. Whether each upper-layer communication line has a bypass or not is determined on the single basis of whether the protection upper-layer communication line is normal or failure. Namely, when the upper-layer communication-line failure-detecting part 164 has detected failure in the protection upper-layer communication line 504, the bypass-information-signal transmission part 803 determines that a bypass is present, and accordingly sends out a signal to the lower-layer apparatus. When the upper-layer communication-line failure-detecting part 164 has not detected failure in the protection upper-layer communication line 504, the bypass-information-signal transmission part 803 determines that a bypass is absent, and accordingly sends out a signal to the lower-layer apparatus. Furthermore, the logical sum (OR) of the bypass information inputted by the operator and the information on whether each protection upper-layer communication line is normal or failure may be found. In this case, the bypass-information-signal transmission parts 800–802 send out bypass-available signals only when the operator's information indicates the presence of a bypass and the protection upper-layer communication line is normal.

Provided in this embodiment of the present invention is an interlayer-coordinated-switching decision part 700. In FIG. 9, the interlayer-coordinated-switching decision part 700 is disposed outside the lower-layer apparatus 310 and the upper-layer apparatuses 110–113. However, the interlayer-coordinated-switching decision part 700 may be disposed inside the lower-layer apparatus 310 or any of the upper-layer apparatuses 110–113.

The interlayer-coordinated-switching decision part 700 receives the failure information on the upper-layer communication lines from the upper-layer communication-line failure-detecting parts 160–164 of the upper-layer apparatuses 110–113, the failure information on the lower-layer communication lines from the lower-layer communication-line failure-detecting parts 360 and 361 of the lower-layer apparatus 310, the failure information on the upper-layer communication lines from the upper-layer communication-line failure-detecting parts 460–463 and 465–468 of the lower-layer apparatus 310.

The interlayer-coordinated-switching decision part 700 has the function to check the failure information on the lower-layer communication lines with that on the upper-layer communication lines when it has received failure information from the failure-detecting parts. The interlayer-coordinated-switching decision part 700 controls the lower-layer communication-line bridge/selector part 430 and the switching-inhibit-signal transmission parts 480–483 of the lower-layer apparatus 310. Besides, the interlayer-coordinated-switching decision part 700 receives bypass information from the bypass-information-signal transmission parts 800–803 of the upper-layer apparatuses 100–103.

Figure 17:
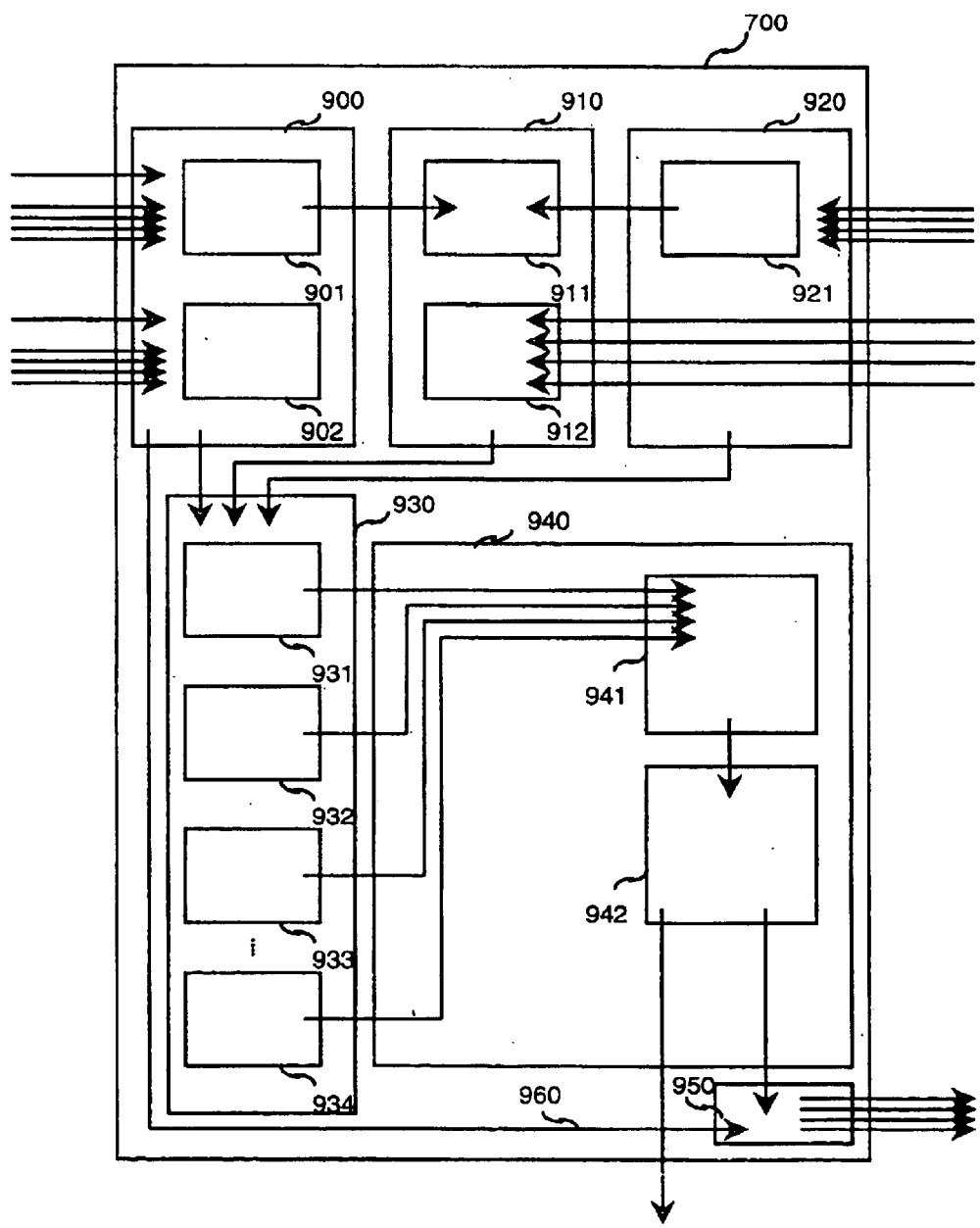
FIG. 17 is a functional block diagram of the coordinated-switching decision part of the first embodiment of the present invention of FIG. 8.

FIG. 17 shows the detailed configuration of the interlayer-coordinated-switching decision part 700. The interlayer-coordinated-switching decision part 700 comprises a failure-information collecting part 900 for collecting the failure information from the lower-layer apparatus, a failure-information collecting part 920 for collecting the failure information from the upper-layer apparatuses, a failure-information checking part 910 for checking the failure information from the lower-layer apparatus with that from the upper-layer apparatuses, a state-calculating part 930, a state-choosing part 940, and a switching-inhibit-signal demanding part 950 for demanding the lower-layer apparatus to send out a switching-inhibit signal to the upper layer.

The failure-information collecting part 900 for collecting the failure information from the lower-layer apparatus has a table 901 for describing the failure information on the working lower-layer communication line 600 sent from the lower-layer apparatus and a table 902 for describing the failure information on the protection lower-layer communication line 601 sent from the lower-layer apparatus. The failure-information collecting part 920 for collecting the failure information from the upper-layer apparatuses has a table 921 for describing the failure information on the working upper-layer communication lines sent from the upper-layer apparatuses. The failure-information checking part 910 for checking the failure information from the lower-layer apparatus with that from the upper-layer apparatuses has a table 911 for describing the information on effective working upper-layer communication lines and a table 912 for describing the information on the effective protection upper-layer communication lines.

The state-calculating part 930 has a table 931 for calculating the first state, a table 932 for calculating the second state, a table 933 for calculating the third state, and a table 934 for calculating the fourth state. The state-choosing part 940 has a decision of the state with the maximum number of available communication lines part 941 and a decision of the state with the minimum number of protection switching part 942. The failure-information collecting part 900 is connected with the demand of the protection switching inhibit signal part 950 through an interrupt-signal line 960. The part 950 is connected with the switching-inhibit-signal transmission parts 480–483 and instructs them whether or not to send out a switching-inhibit signal in accordance with the decision of the interlayer-coordinated-switching decision part 700.

The table 901 for describing the failure information on the working lower-layer communication line 600 receives the failure information from the working lower-layer communication-line failure-detecting part 360 and the failure information from the upper-layer communication-line failure-detecting parts 460–463 corresponding to the working lower-layer communication line 600 and describes the failure information for each upper-layer communication line. The table 902 for describing the failure information on the protection lower-layer communication line 601 receives the failure information from the protection lower-layer communication-line failure-detecting part 361 and the failure information from the upper-layer communication-line failure-detecting parts 465–468 corresponding to the protection lower-layer communication line 601 and describes the failure information for each upper-layer communication line.

The table 921 for describing the failure information on the working upper-layer communication lines receives the failure information from the upper-layer communication-line failure-detecting parts 160–163 corresponding to the working upper-layer communication lines 500–503 and describes the failure information for each upper-layer communication line.

The table 911 for describing the information on effective working upper-layer communication lines describes the information on each of nondefective ones of the working upper-layer communication lines 500–503, a nondefective line meaning a line with no failure between the lower-layer apparatus 310 and the upper-layer apparatus 110, 111, 112, or 113, as the case may be. Effective working upper-layer communication lines are identified by logically subtracting the contents of the table 901 of failure information on the working lower-layer communication line from the contents of the table 921 of failure information on the working upper-layer communication lines. Namely, in case that the upper-layer communication line 500 is described as defective on the table 921 and the same line is described as normal on the table 901, it can be considered that a failure occurred in the upper-layer communication line 500 between the lower-layer apparatus 310 and the upper-layer apparatus 110. Accordingly, the upper-layer communication line 500 is described as unusable in the table 911 of information on effective working upper-layer communication lines. In case that the upper-layer communication line 500 is described as defective on the table 921 and the same line is described again as defective on the table 901, it can be considered that failure occurred on the left side of the lower-layer apparatus 310 in FIG. 9, namely, in the lower-layer communication line 600 or above the line. Accordingly, the upper-layer communication line 500 is described as usable in the table 911. If the failure-detecting method of the lower-layer apparatus and that of the upper-layer apparatuses are not identical with each other, and if the upper-layer communication line 500 is described as normal in the table 921 and the same line is described as defective in the table 901, it is considered that the upper-layer apparatus is receiving data normally and the description in the table 921 is adopted. Accordingly, the upper-layer communication line 500 is described as usable in the table 911.

The table 912 for describing the information on effective protection communication lines describes the information from the bypass-information-signal transmission parts 800–803 for each upper-layer communication line. In other words, the table 912 describes a protection line for each of the working upper-layer communication lines 500–503 so that when one of the upper-layer apparatuses 110–113 has detected a failure in its working line, the communication line can be shifted to a protection line.

There is not strict rule for dividing cases into states and the number of tables to be prepared. Now, an embodiment with four state tables will be described. In the first state, only the working communication lines are used in both the lower and upper layers. In the second state, the working communication line is used in the lower layer and nondefective one of the working and protection communication lines is used by each upper-layer apparatus. In the third state, the protection communication line is used in the lower layer and the working communication lines are used in the upper layer. In the fourth state, the protection communication line is used in the lower layer and nondefective one of the working and protection communication lines is used by each upper-layer apparatus.

Now, the values of each state table will be described. Each state table describes which communications lines can be chosen when coordinated switching has been completed in accordance with the state.

In the first state, because no switching takes place in both the lower and upper layers, the state table, or state-calculating table, 931 has the same values as the table 921 of failure information on the working upper-layer communication lines.

In the second state, because no switching takes place in the lower layer but switching takes place in the upper layer, the values of the table 921 of failure information on working upper-layer communication lines and the values of the table 912 of information on effective protection upper-layer communication lines are compared path by path and the better values are adopted by the state-calculating table 932 (if a path has a nondefective line, its value is adopted).

In the third state, because switching takes place in the lower layer but no switching takes place in the upper layer, the logical sum (OR) of the value of the table 902 of failure information on the protection lower-layer communication line and the value of the table 911 of information on effective working upper-layer communication lines is found path by path and adopted by the state-calculating table 933.

In the fourth state, switching takes place in both the lower and upper layers, the value of the third-state calculating table 933 and the value of the table 912 of effective protection upper-layer communication lines are compared path by path and the better value is adopted by the state-calculating table 934 (if a path has a nondefective line, its value is adopted).

The numbers of usable upper-layer communication lines and the numbers of times of switching are calculated from the first- to fourth-state calculating tables 931–934, and the state-choosing part 940 chooses the best state. The number of usable upper-layer communication lines in each state is the number of normal lines described as usable in the calculating table of said state, 931, 932, 933, or 934, as the case may be. Based on the numbers of usable upper-layer communication lines in the four states, the decision of the state with the maximum number of available communication lines part 941 extracts the state which has the largest number of available communication lines. If two or more states have one and the same largest number, the part 941 extracts those states. Then, the part 941 passes the extracted state or states to the part 942 for extracting the state with the smallest number of times of protection switching.

The number of times of protection switching is calculated as follows. In the first state, because no switching takes place in both the lower and upper layers, the number of times of protection switching is zero. In the third state, because switching takes place in the lower layer alone, the number of times of protection switching is one. In the second state, because switching takes place in the upper layer alone, the upper-layer communication lines described as defective in the table 901 of failure information on the working lower-layer communication line are switched, if this state is extracted. Therefore, the number of times of protection switching is equal to the number of the lines described as defective in the table 901. In the fourth state, switching takes place in both the lower and upper layers. In the upper layer, the upper-layer communication lines described as defective in the table 902 of failure information on the protection lower-layer communication line are switched, if this state is extracted. Therefore, the number of times of protection switching in the upper layer is equal to the number of the lines described as defective in the table 902. The number in the upper lay and the number of times of switching in the lower layer, one, add up to the total number of times of protection switching.

Based on the above calculation results, the part 942 for extracting the state with the smallest number of times of protection switching extracts a state which has the minimum number of times of protection switching. If two or more states have one and the same largest number of available communication lines and one and the same smallest number of times of protection switching, a state requiring no switching in the lower layer is chosen because switching in a single layer (the upper layer in this case) requires a shorter time than switching in both the layers. Namely, if two or more states have one and the same largest number of available communication lines and one and the same smallest number of times of protection switching, the part 942 chooses not the third or fourth state, but the second state.

When the part 942 has chosen a state requiring switching in the lower layer, namely, the third or fourth state, the lower-layer communication-line bridge/selector part 430 of the lower-layer apparatus 310 is activated to choose the protection lower-layer communication line 601. When the switching in the lower layer has been completed, or in case that switching in the lower layer is unnecessary (in other words, the first or second state has been chosen), the switching-inhibit-signal demanding part 950 is notified that it is no longer necessary to continue sending out the switching-inhibit signal to the upper layer. Then, the switching-inhibit-signal demanding part 950 instructs the switching-inhibit-signal transmission parts 480–483 to stop sending out the switching-inhibit signal to the upper layer. Then, switching processing begins in the upper layer.

The processing procedure for coordinated switching in case of the occurrence of failure will be described below.

The upper-layer communication-line failure-detecting parts 460–463 and 465–468 of the lower-layer apparatus 310 in this embodiment are capable of detecting failure in the upper-layer communication lines line by line.

When the lower-layer communication-line failure-detecting part 360 or the upper-layer communication-line failure-detecting parts 460–463 have detected failure, they send the failure information to the interlayer-coordinated-switching decision part 700 and the AIS transmission parts 470–473. Before or when the AIS transmission parts 470–473 send out an AIS to the upper-layer apparatuses 110–113, the interlayer-coordinated-switching decision part 700 instructs the switching-inhibit-signal transmission parts 480–483 to send out a switching-inhibit signal to the upper-layer apparatuses 110–113 so that switching does not begin in the upper layer.

In the above process, when the interlayer-coordinated-switching decision part 700 has received a failure signal from any of the lower-layer communication-line failure-detecting part 360 and the upper-layer communication-line failure-detecting parts 460–463, the failure-information collecting part 900 for collecting the failure information from the lower-layer apparatus generates and sends out an interrupt signal to the part 950 through the interrupt-signal line 960. Upon the receipt of the interrupt signal, the part 950 instructs the switching-inhibit-signal transmission parts 480–483 to send out a switching-inhibit signal to the upper layer.

Then, the interlayer-coordinated-switching decision part 700 collects failure information for a prescribed time period from the upper-layer communication-line failure-detecting parts 460–463 and 465–468 of the lower-layer apparatus 310 and describes the failure information for each upper-layer communication line in the table 901 of failure information on the working lower-layer communication line and in the table 902 of failure information on the protection lower-layer communication line. It is to cope with probable time lag in transmitting failure information from the plurality of failure-detecting parts to the interlayer-coordinated-switching decision part 700. Such time lag may occur, regarding one and the same failure, due to different transmission speeds, different transmission paths, etc.

Besides, the interlayer-coordinated-switching decision part 700 collects failure information for the prescribed time period mentioned above from the upper-layer communication-line failure-detecting parts 160–163 and the bypass-information-signal transmission parts 800–803 of the upper-layer apparatuses 110–113. Then, by using the checking method described earlier in the paragraphs of the details of the interlayer-coordinated-switching decision part 700, the interlayer-coordinated-switching decision part 700 checks the failure information from the lower-layer apparatus 310 with that from the upper-layer apparatuses 110–113.

Figure 18:
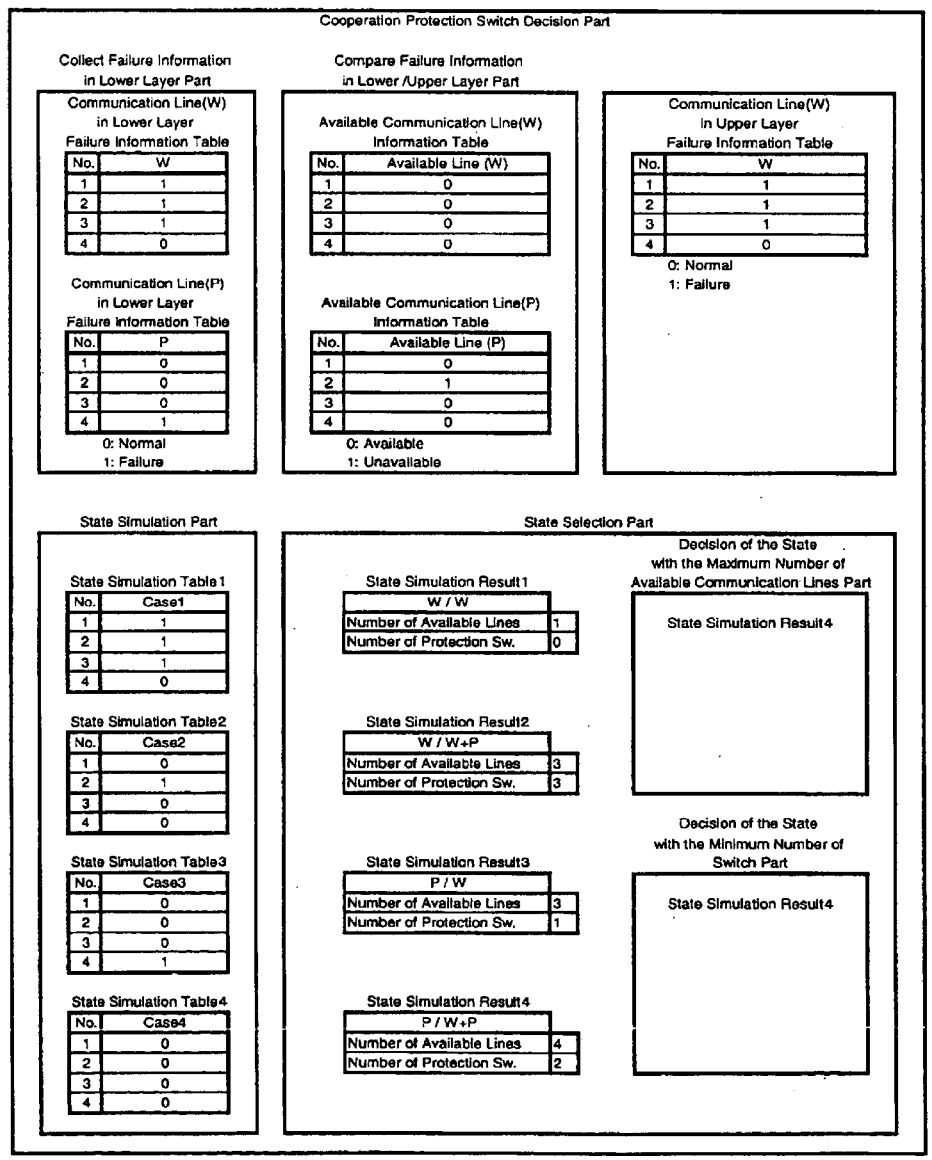
FIGS. 18, 19, and 20 show examples of the processing, upon the occurrence of failure, of the coordinated-switching decision part of the first embodiment of the present invention of FIG. 8.
Figure 19:
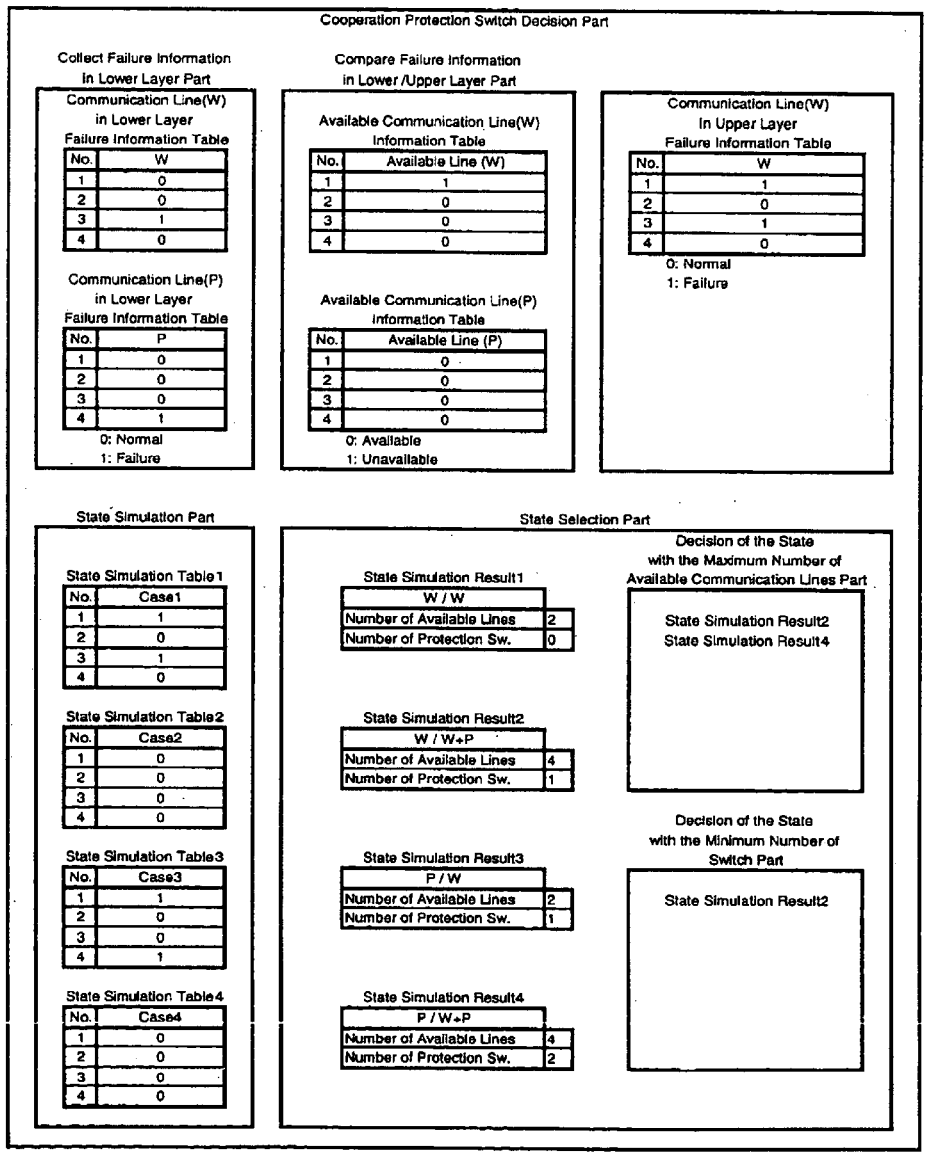
Figure 20:
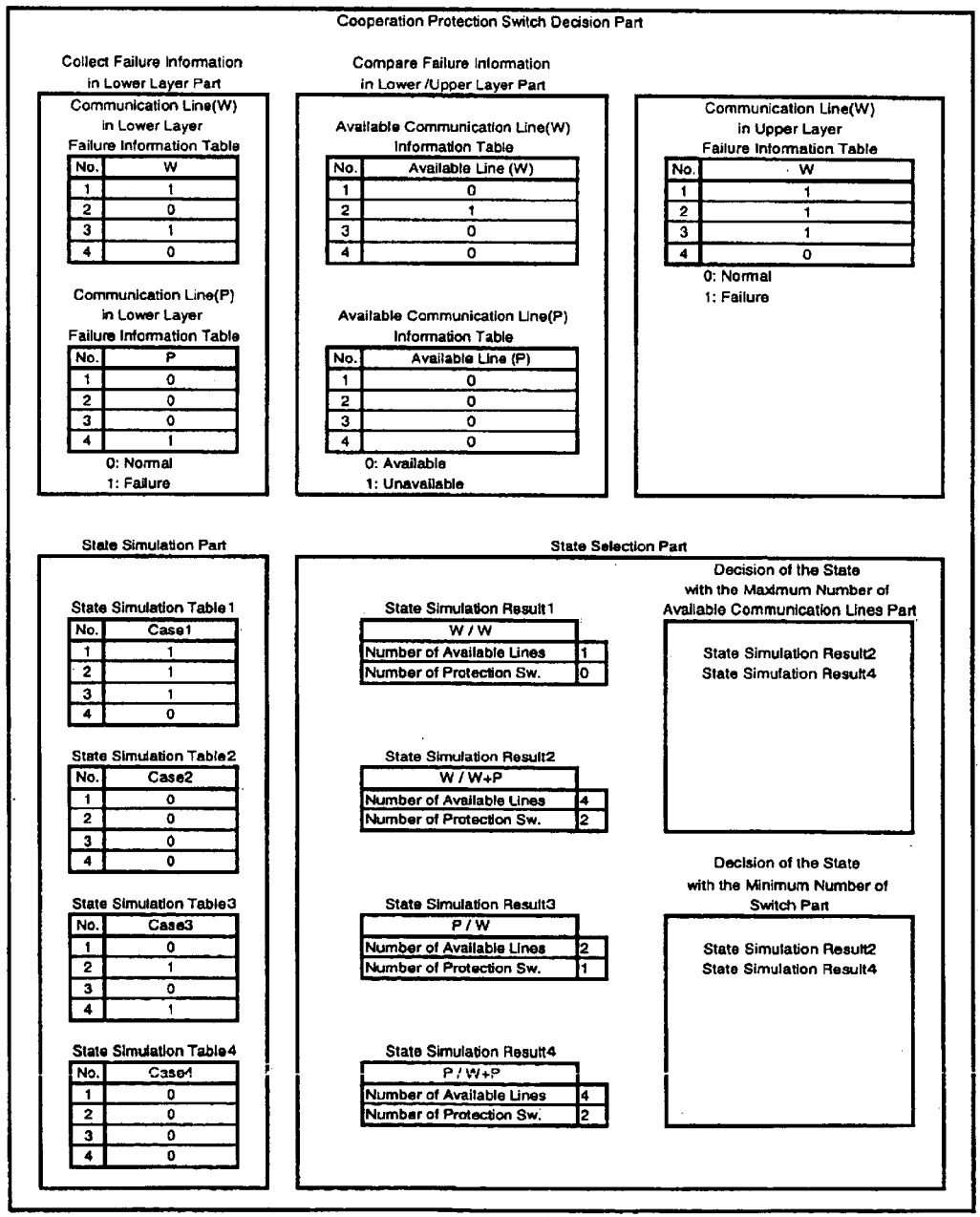
Figure 21:
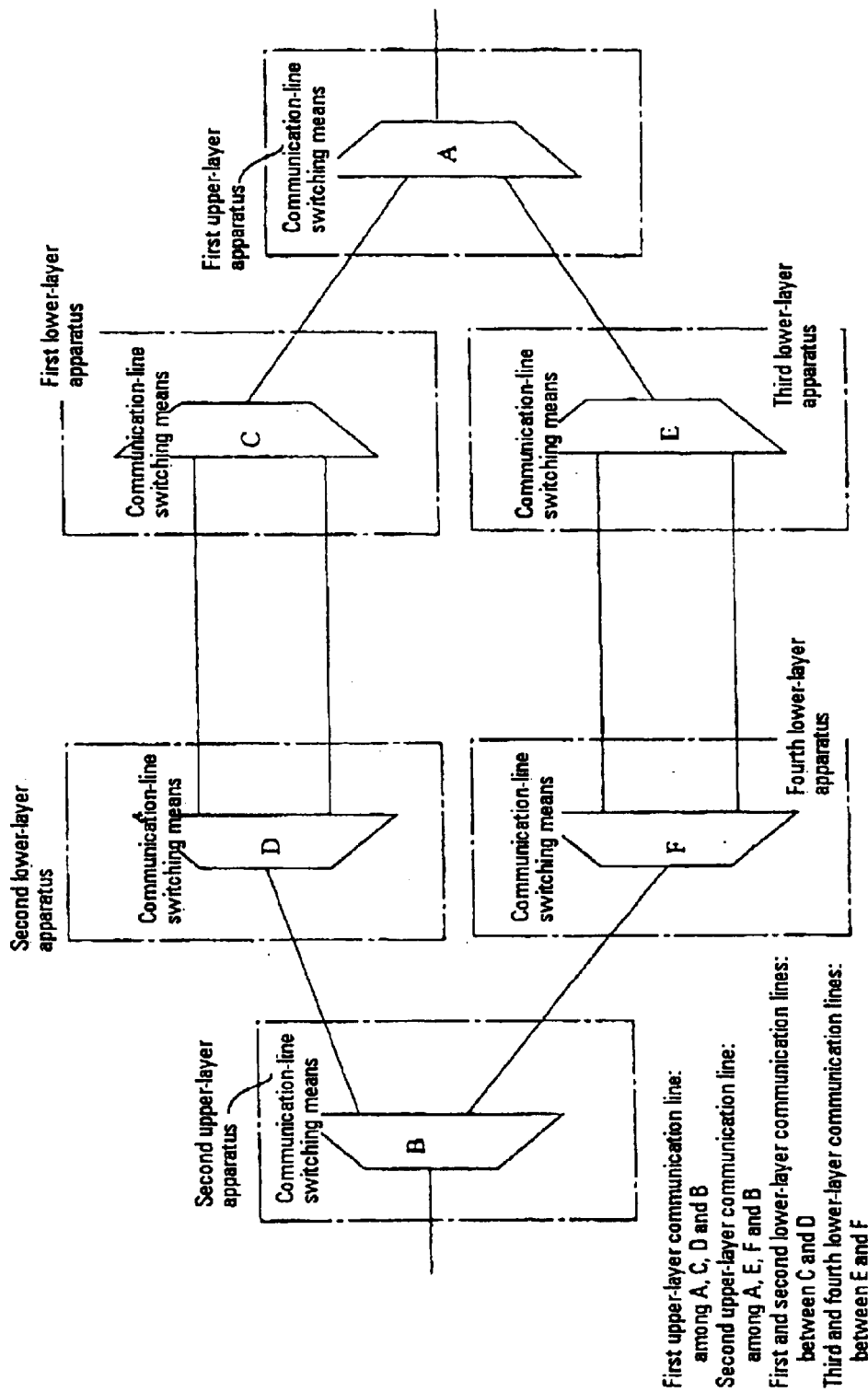
FIG. 21 is an illustration for describing an embodiment of the present invention, and shows the configuration of a network.

Each of FIGS. 18, 19, and 20 shows an example of the processing of the interlayer-coordinated-switching decision part 700. In the example of FIG. 18, the upper-layer communication-line failure-detecting parts 460–462 corresponding to the working lower-layer communication line 600 detected failure, and the upper-layer communication-line failure-detecting part 468 corresponding to the protection lower-layer communication line 601 detected failure. Besides, the upper-layer communication-line failure-detecting parts 160–162 of the upper-layer apparatuses 110–112 detected failure of the upper-layer communication lines 500–502, and the bypass-information-signal transmission part 801 of the upper-layer apparatus 111 indicates that there is no bypass, meaning that the protection line of the upper-layer communication line 501 is not usable.

The nonfailure and failure information from the lower- and upper-layer apparatuses is described as "0" and "1", respectively, in the failure-information tables 901, 902, and 921. The information on the availability of bypasses in the upper layer sent from the upper-layer apparatuses is described as "0" standing for a usable line and "1" standing for an unusable line in the table 912 of information on effective protection upper-layer communication lines.

Described in the table 911 of information on effective working upper-layer communication lines is the remainder after subtracting the contents of the table 901 from the contents of the table 921. It can be considered in this example that the failure occurred above the lower-layer apparatus 310 (on the left side in FIG. 9). Therefore, the upper-layer communication lines 500–503 between the lower-layer apparatus 310 and the upper-layer apparatuses 110–113 are essentially normal and usable.

Using the contents of these tables 901, 902, 911, 912, and 921, calculation is carried out for the four states. In the first state wherein no switching takes place in both the lower and upper layers, the state-calculating table 931 has the same values as the failure-information table 921.

In the second state wherein no switching takes place in the lower layer but switching takes place in the upper layer, the values of the failure-information table 921 and the values of the information table 912 are compared path by path and the better, or smaller, as shown in the example of FIG. 18, value is adopted by the state-calculating table 932.

In the third state wherein switching takes place in the lower layer but no switching takes place in the upper layer, the logical sum (OR) of the value of the failure-information table 902 and the value of the information table 911 is found path by path and adopted by the state-calculating table 933.

In the fourth state wherein switching takes place in both the upper and lower layers, the value of the third-state calculating table 933 and the value of the information table 912 are compared path by path and the better, or smaller, value is adopted by the state-calculating table 934.

The number of usable upper-layer communication lines and the number of times of switching in each state are calculated from the state-calculating table of said state 931, 932, 933, or 934, as the case may be. The number of usable upper-layer communication lines in each state is the number of normal lines described as usable in the state-calculating table of said state 931, 932, 933, or 934, as the case may be. In this example, the fourth state wherein switching takes place in both the upper and lower layers has the largest number of usable communication lines, four, among the four states.

Because the fourth state alone was chosen by the part 941 for extracting the state with the largest number of available communication lines, the fourth state is adopted by the part 942 for extracting the state with the smallest number of times of protection switching.

Then, the lower-layer communication-line bridge/selector part 430 of the lower-layer apparatus 310 is activated to choose the protection lower-layer communication line 601. When switching in the lower layer has been completed, the part 950 is notified that it is no longer necessary to continue sending out the switching-inhibit signal to the upper-layer apparatuses. Then, the part 950 instructs the switching-inhibit-signal transmission parts 480–483 to stop sending out the switching-inhibit signal to the upper-layer apparatuses. Then, switching processing begins in the upper layer.

Now, the example of FIG. 19 will be described. In this example, the upper-layer communication-line failure-detecting part 462 corresponding to the working lower-layer communication line 600 detected failure, and the upper-layer communication-line failure-detecting part 468 corresponding to the protection lower-layer communication line 601 detected failure. Besides, the upper-layer communication-line failure-detecting parts 160 and 161 detected failure of the upper-layer communication lines 500 and 502, respectively, and every bypass-information-signal transmission part 800–803 has indicated that there is a bypass, meaning that all the protection communication lines of the upper layer are usable.

As in the case of the first example, the above nonfailure and failure information from the lower- and upper-layer apparatuses is described in the failure-information tables 901, 902, and 921. The information on the availability of bypasses in the upper layer sent from the upper-layer apparatuses is described in the information table 912.

Described in the information table 911 is the remainder after subtracting the contents of the failure-information table 901 from the contents of the failure-information table 921. In this example, the failure occurred in the upper-layer communication line 500 between the lower-layer apparatus 310 and the upper-layer apparatus 110. If the lower-layer apparatus 310 makes line switching to restore the failed line, the upper-layer communication line 500 remains unusable.

As in the case of the first example, calculation is carried out for the four states to obtain the state-calculating table 931–934. Then, the number of usable upper-layer communication lines and the number of times of switching in each state are calculated from the state-calculating table of said state 931, 932, 933, or 934, as the case may be. In this example, the second and fourth states have one and the same largest number of usable communication lines, that is, four. Accordingly, the part 941 chooses the second and fourth states and notifies the result to the part 942.

The numbers of times of protection switching in this example are calculated as follows. The number of times of protection switching in the second state is the number of communication lines described as defective in the failure-information table 901, that is, one. The number of times of protection switching in the fourth state is the sum of the number of communication lines described as defective in the failure-information table 902 and the number of times of switching in the lower layer, that is, one, the sum being two. Accordingly, the part 942 for extracting the state with the smallest number of times of protection switching chooses the second state.

In the second state, switching takes place in the upper layer while no switching takes place in the lower layer. Accordingly, the part 942 notifies the part 950 that it is no longer necessary to continue sending out the switching-inhibit signal to the upper-layer apparatuses. Then, the part 950 instructs the switching-inhibit-signal transmission parts 480–483 to stop sending out the switching-inhibit signal to the upper-layer apparatuses. Then, switching processing begins in the upper layer.

Now, the example of FIG. 20 will be described. In this example, the upper-layer communication-line failure-detecting parts 460 and 462 corresponding to the working lower-layer communication line 600 have detected failure, and the upper-layer communication-line failure-detecting part 468 corresponding to the protection lower-layer communication line 601 has detected failure. Besides, the upper-layer communication-line failure-detecting parts 160, 161, and 162 have detected failure of the upper-layer communication lines 500, 501, and 502, respectively, and every bypass-information-signal transmission part 801 has indicated that there is a bypass, meaning that all the protection communication lines in the upper layer are usable.

As in the case of the first example, the above nonfailure and failure information from the lower- and upper-layer apparatuses is described in the failure-information tables 901, 902, and 921. The information on the availability of bypasses in the upper layer sent from the upper-layer apparatuses is described in the information table 912.

Described in the information table 911 is the remainder after subtracting the contents of the failure-information table 901 from the contents of the failure-information table 921. In this example, the failure occurred in the upper-layer communication line 501 between the lower-layer apparatus 310 and the upper-layer apparatus 111. If the lower-layer apparatus 310 makes line switching to restore the failed lines, the upper-layer communication line 501 remains unusable.

As in the case of the first example, calculation is carried out for the four states to obtain the state-calculating table 931-934. Then, the number of usable upper-layer communication lines and the number of times of switching in each state are calculated from the state-calculating table of said state 931, 932, 933, or 934, as the case may be. In this example, the second and fourth states have one and the same largest number of usable communication lines, that is, four. Accordingly, the part 941 chooses the second and fourth states and notifies the result to the decision of the state with the minimum number of protection switching part 942.

In either state, the number of times of protection switching is found to be two. Accordingly, the two states remain chosen at the part 942. If two or more states have one and the same largest number of usable communication lines and one and the same smallest number of times of protection switching, a state requiring no switching in the lower layer is chosen because switching in a single layer requires a shorter time than switching in both the layers. In accordance with this choosing rule, the part 942 chooses the second state. Then, the part 942 instructs the demand of the protection switching inhibit signal part 950, which in turn instructs the switching-inhibit-signal transmission parts 480–483 to stop sending out the switching-inhibit signal to the upper-layer apparatuses. Then, switching processing begins in the upper layer.

It is not necessary for the upper-layer communication-line failure-detecting parts 460–463 and 465–468 of the lower-layer apparatus 310 to be identical with the upper-layer communication-line failure-detecting parts 160–164 of the upper-layer apparatuses 110–113. The failure-detecting system of the failure-detecting parts 460–463 and 465–468 may be simplified or may make bundles of lines to detect failure bundle by bundle. In this case, however, checking the failure information from the lower-layer apparatus with that from the upper-layer apparatuses results in inconsistency, and even when failure has occurred above the lower-layer apparatus 310, the failure is regarded as existing between the lower-layer apparatus 310 and upper-layer apparatuses 110–113.

When lower-layer apparatus 310 has detected failure, but the upper-layer apparatuses 110–113 have not detected the failure, the detecting result of the upper-layer apparatuses 110–113 is given priority, the upper-layer communication lines regarded as functioning normally.

Figure 16:
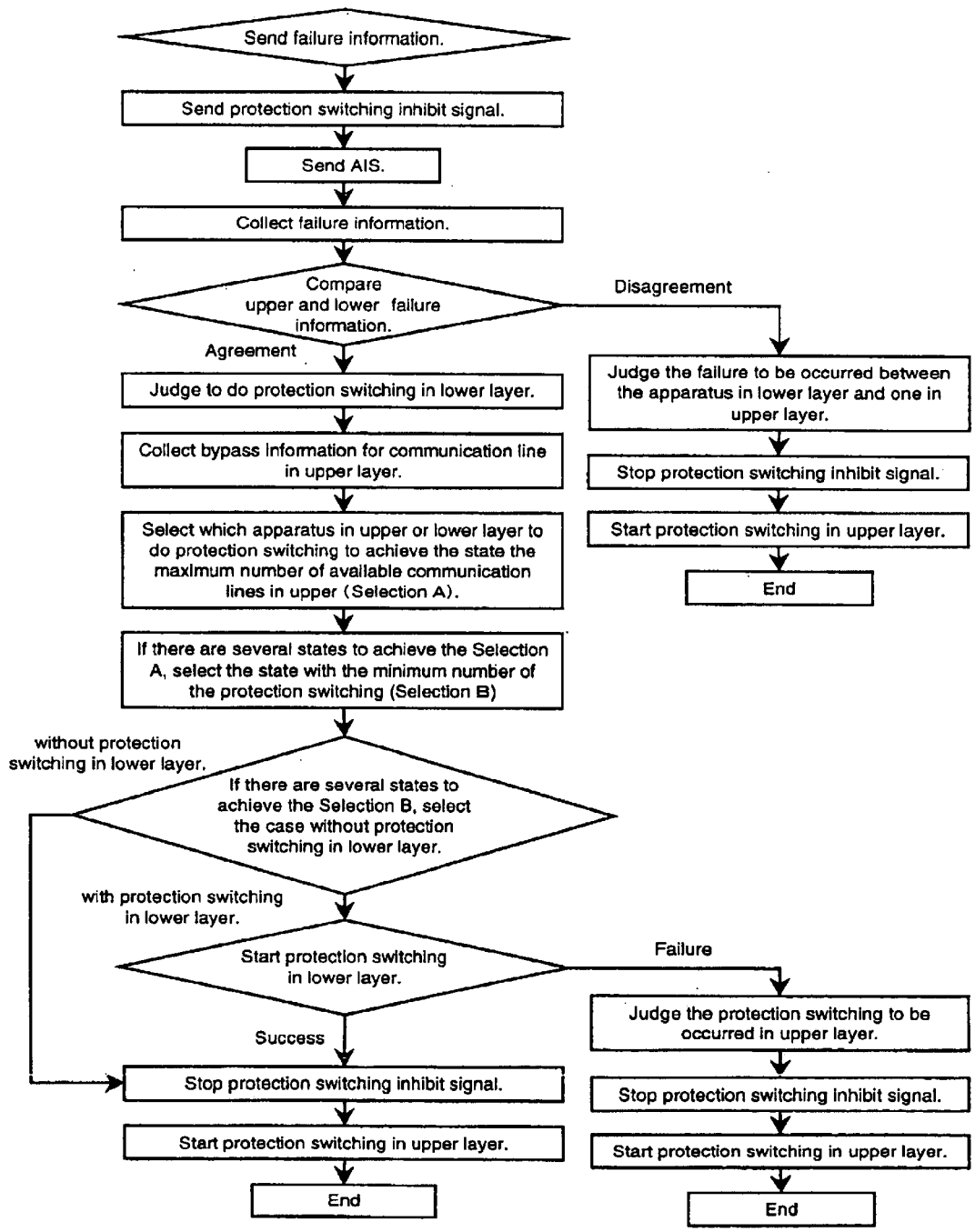
FIG. 16 is a flowchart of the processing carried out by the coordinated-switching decision part of the first embodiment of the present invention of FIG. 8.

FIG. 16 is a flowchart of the processing of the interlayer-coordinated-switching decision part 700 to realize the first embodiment of the present invention.

Although described above is a network which has the switching protocol of the 1+1 type and has a set of a working line and a protection one through which the same data are transmitted during the normal operation of the network, the embodiment of the present invention is applicable to a network having the protocol of the 1:N type.

In the case of the switching protocol of the 1:N type, no data are transmitted through the protection communication line or the data of one on the "N" communication lines are transmitted through the protection line under the condition of no auxiliary line while the network is operating normally. When switching processing has begun, the system shifts into a state called "bridge" wherein the data of the failed working communication line is switched to the protection line. Then, the system shifts into a state called "switch" wherein the receiving side chooses the protection line to complete the switching processing. The state of the protection line can be determined in the bridge state. Namely, in case that the embodiment of the present invention is applied to a network with the protocol of the 1:N type, when the interlayer-coordinated-switching decision part 700 has detected failure in the working lower-layer communication line 600, the part 700 instructs the switching-inhibit-signal transmission parts 480–483 to send out a switching-inhibit signal to the upper layer and the lower-layer communication-line bridge/selector part 430 to shift into the bridge state. Accordingly, the interlayer-coordinated-switching decision part 700 can determine the state of the protection lower-layer communication line 601. The switching processing thereafter can be carried out as in the case of the protocol of the 1+1 type. In addition, because the embodiment of the present invention does not depend on a ring-type network, a mesh-type network, or the like, it is applicable to such networks. The first embodiment can be reduced to an embodiment comprising a simpler set of apparatuses by omitting some functions from the first embodiment.

Second Embodiment

Figure 10:
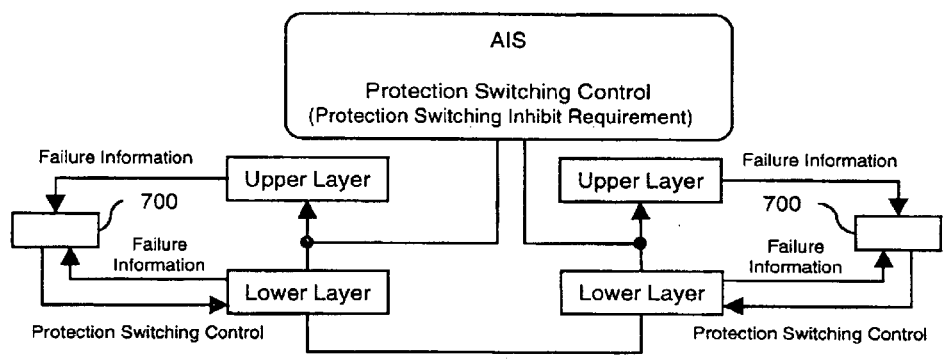
FIG. 10 is a schematic block diagram for describing another embodiment of the present invention, and shown in this figure is the concept of switching processing in the lower and upper layers.

The second embodiment of switching device with a coordinated-switching decision part of the present invention will now be described. FIG. 10 is a conceptual illustration of the embodiment. The second embodiment is the first embodiment less the function-of conveying the information on whether the upper-layer apparatuses have bypasses or not from the upper layer to the coordinated-switching decision part.

Figure 11:
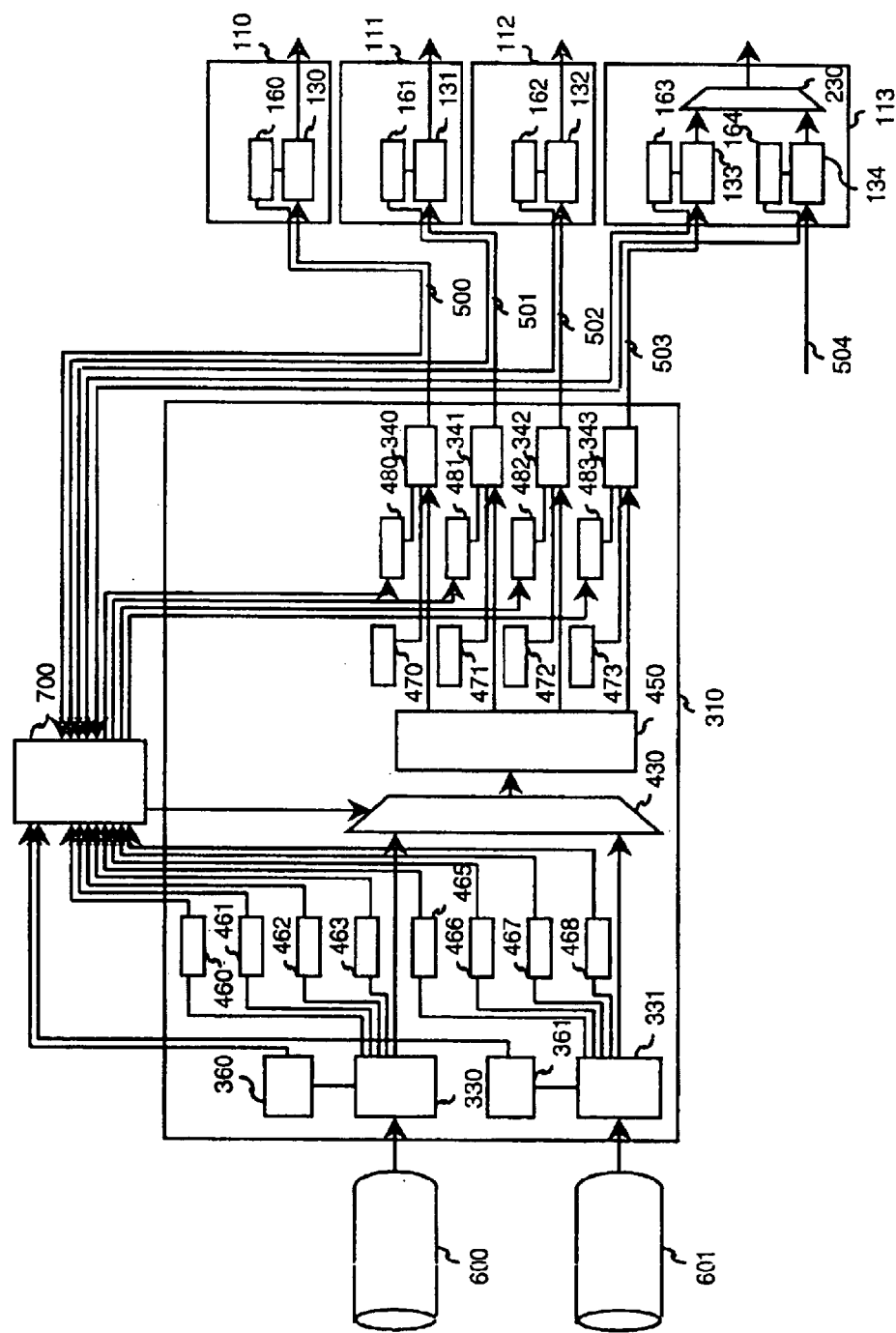
FIG. 11 is a block diagram for describing another embodiment of the present invention, and shows the configuration of the switching system with a coordinated-switching decision part.

FIG. 11 shows the configuration of the second embodiment of switching device of the present invention in detail. FIG. 11 shows the details of a part of the network of FIG. 2 in case that the network is constructed of conventional lower- and upper-layer apparatuses.

The second embodiment is the first embodiment less the function of conveying the information on bypasses in the upper layer. The interlayer-coordinated-switching decision part 700 uses the information on whether protection lines in the upper layer are normal or failure, instead of the bypass information. Because the switching processing in this embodiment may be carried out in the same way as the switching processing in the first embodiment, its description is omitted here.

Third Embodiment

Figure 12:
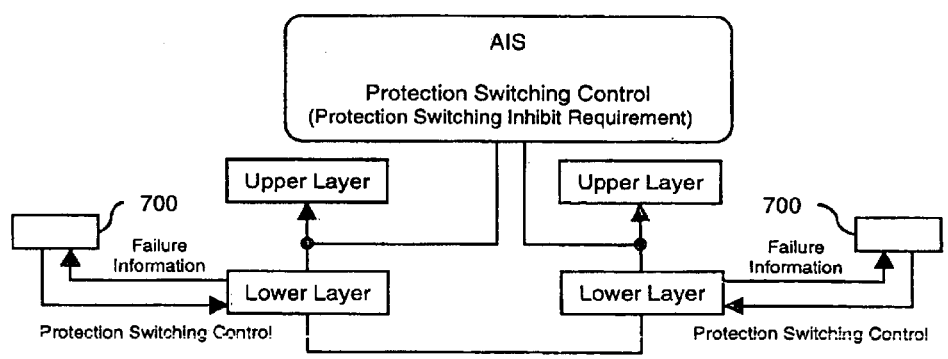
FIG. 12 is a schematic block diagram for describing still another embodiment of the present invention, and shown in this figure is the concept of switching processing in the lower and upper layers.

The third embodiment of switching device with a coordinated-switching decision part of the present invention will now be described. FIG. 12 is a conceptual illustration of the embodiment. The third embodiment is the second embodiment less the function of conveying upper-layer communication-line failure information from the upper-layer apparatuses to the interlayer-coordinated-switching decision part.

Figure 13:
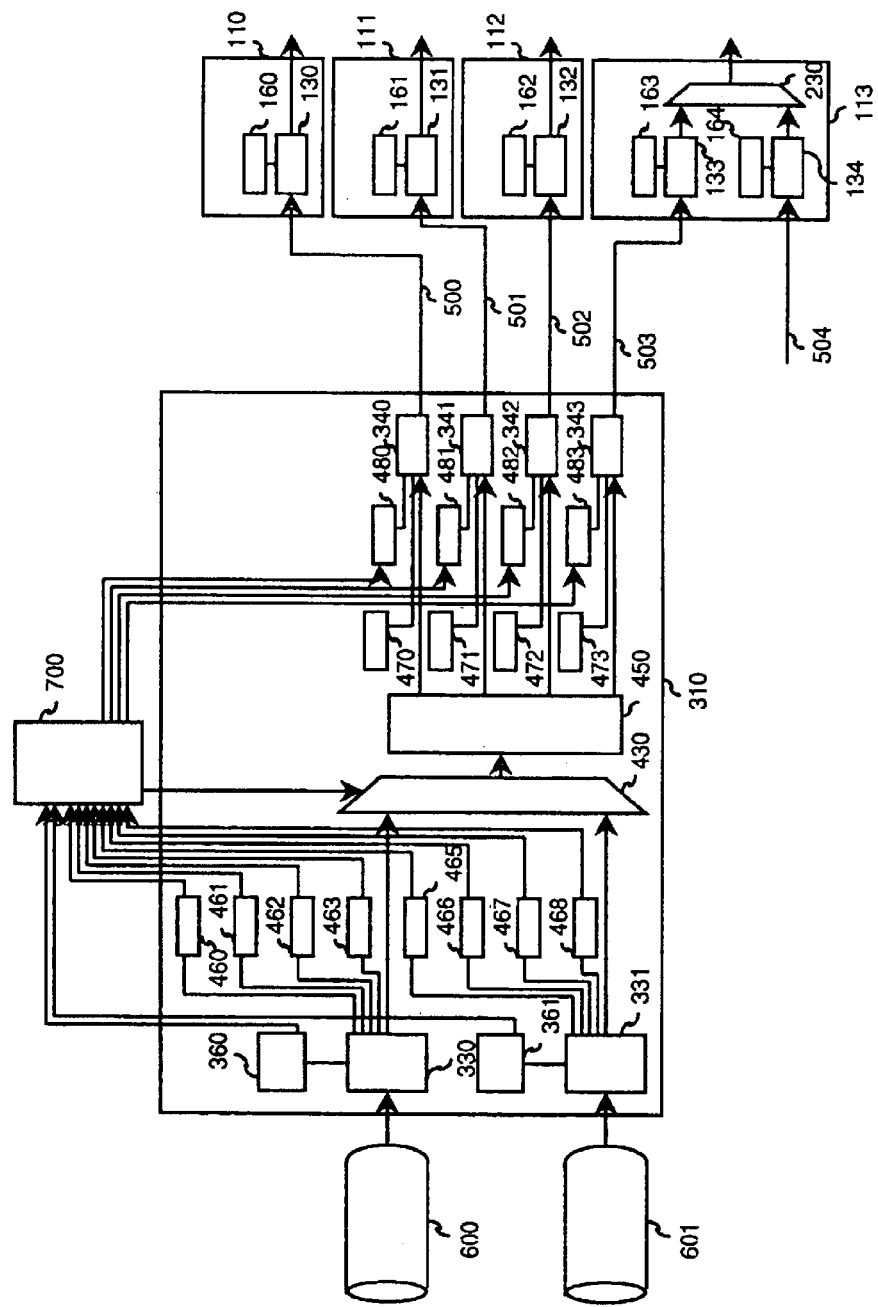
FIG. 13 is a block diagram for describing the embodiment of FIG. 12 and shows the configuration of the switching system with a coordinated-switching decision part.

FIG. 13 shows the configuration of the third embodiment of switching device of the present invention in detail. FIG. 13 shows the details of a part of the network of FIG. 2 in case that the network is constructed of conventional lower- and upper-layer apparatuses.

The interlayer-coordinated-switching decision part 700 does not check the failure information from the lower-layer apparatus 310 with that form the upper-layer apparatuses 100–103, but controls the switching in the lower layer and instructs the switching-inhibit-signal transmission parts 480–483 to stop sending out the switching-inhibit signal to the upper layer, on the basis of the failure information from the lower-layer apparatus 310.

The switching-control method of the third embodiment differs from that of the first embodiment. In the third embodiment, the interlayer-coordinated-switching decision part 700 does not receive failure information from the upper-layer apparatuses. Therefore, to secure the maximum number of communication lines based on the available failure information is to choose one with better quality between the working communication line 600 and the protection communication line 601. In this embodiment, the number of times of switching inclusive of switching in the upper layer can not be minimized because the interlayer-coordinated-switching decision part 700 dose not receive failure information from the upper-layer apparatuses.

Another method of switching the communication line between the working and protection lines in the lower layer is to prioritize the upper-layer communication lines and switch the communication line according to the priority. For example, in FIG. 18, there is no bypass for the communication line 2 in the upper layer. If the operator of the lower-layer apparatus knows it, the operator gives top priority to the communication line 2, that is to say, the lower-layer apparatus switches the communication line in the lower layer to either the working or the protection line which can communicate with the line 2. In the case of the example of FIG. 18, this switching method results in the same switching processing in both the lower and upper layers as the first embodiment wherein bypass information is used. The operator may use other criteria than the availability of bypasses in prioritizing the upper-layer communication lines. Once the switching-control method is decided, the interlayer-coordinated-switching decision part 700 makes line switching in the lower layer, lifts the switching-inhibit signal to the upper layer apparatuses, and makes line switching in the upper layer, as in the case of the first embodiment.

Fourth Embodiment

The fourth embodiment of switching device with a coordinated-switching decision part of the present invention will now be described. The conceptual illustration of the second embodiment shown in FIG. 10 is applicable to this embodiment. This embodiment is the second embodiment less the upper-layer communication-line failure-detecting parts of the lower-layer apparatus 310.

Figure 14:
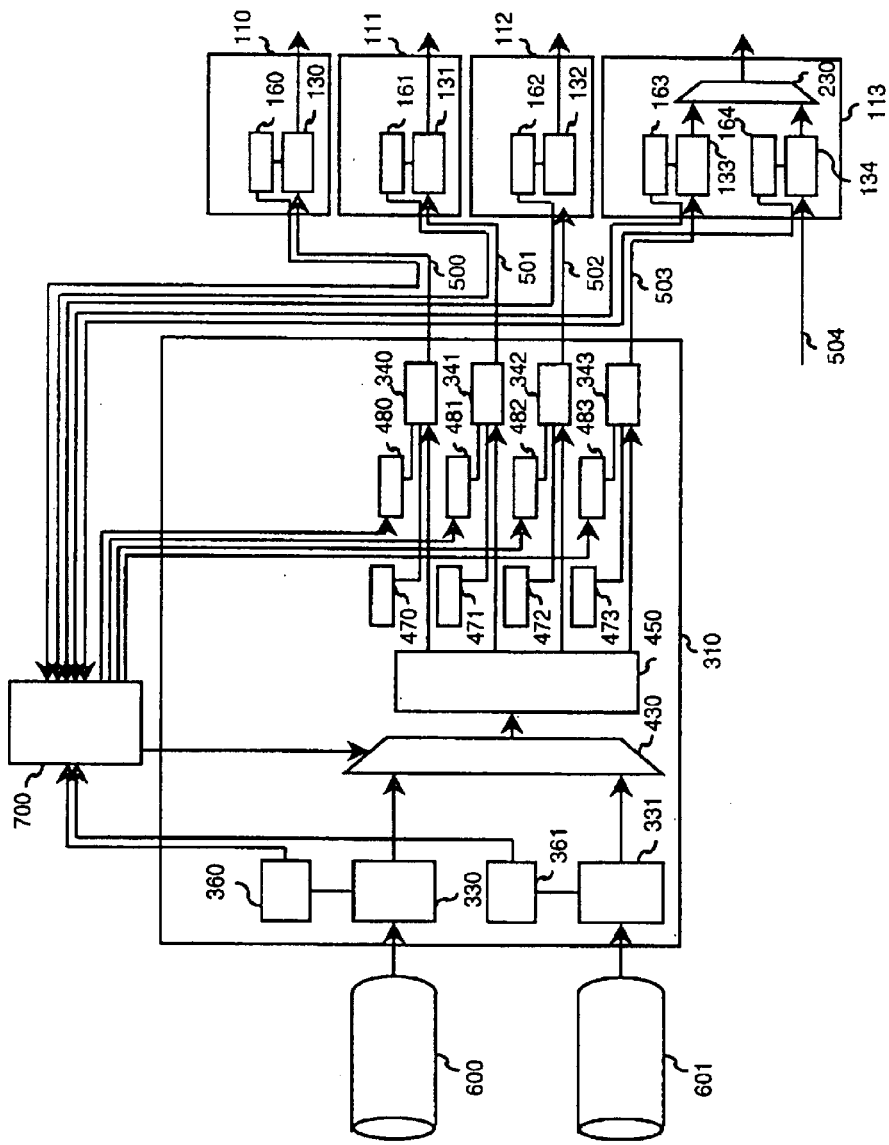
FIG. 14 is a block diagram for describing a fourth embodiment of the present invention and shows the configuration of the switching system with a coordinated-switching decision part.

FIG. 14 shows the configuration of this embodiment of switching device of the present invention in detail. FIG. 14 shows the details of a part of the network of FIG. 2 in case that the network is constructed of conventional lower- and upper-layer apparatuses.

This embodiment is effective in case that the distance between the lower-layer apparatus and the upper-layer apparatuses is short; for example, they are disposed in the same-central office, or the components or communication lines connecting the lower-layer apparatus and the upper-layer apparatuses are highly reliable, and hence the probability of occurrence of failure in the section between the lower-layer apparatus and the upper-layer apparatuses is significantly lower than those of the other sections.

The interlayer-coordinated-switching decision part 700 controls line switching in the lower layer and lifts the switching-inhibit signal to the upper-layer apparatuses 110–113 based on the failure information sent from the upper-layer communication-line failure-detecting parts 160–164 of the upper-layer apparatuses 110–113. The interlayer-coordinated-switching decision part 700 controls line switching so as to secure the largest number of normal communication lines through which the upper-layer apparatuses can receive data. As in the case of the other embodiments, while line switching is taking place in the lower layer, a switching-inhibit signal is sent out to the upper-layer apparatuses.

As described above, the present invention provides a switching system which comprises two layers, each having an independent switching function, and utilizes both the switching functions, taking full advantage of the features of the functions in accordance with the conditions of the communication lines, without disenabling either function.

Figure 7:
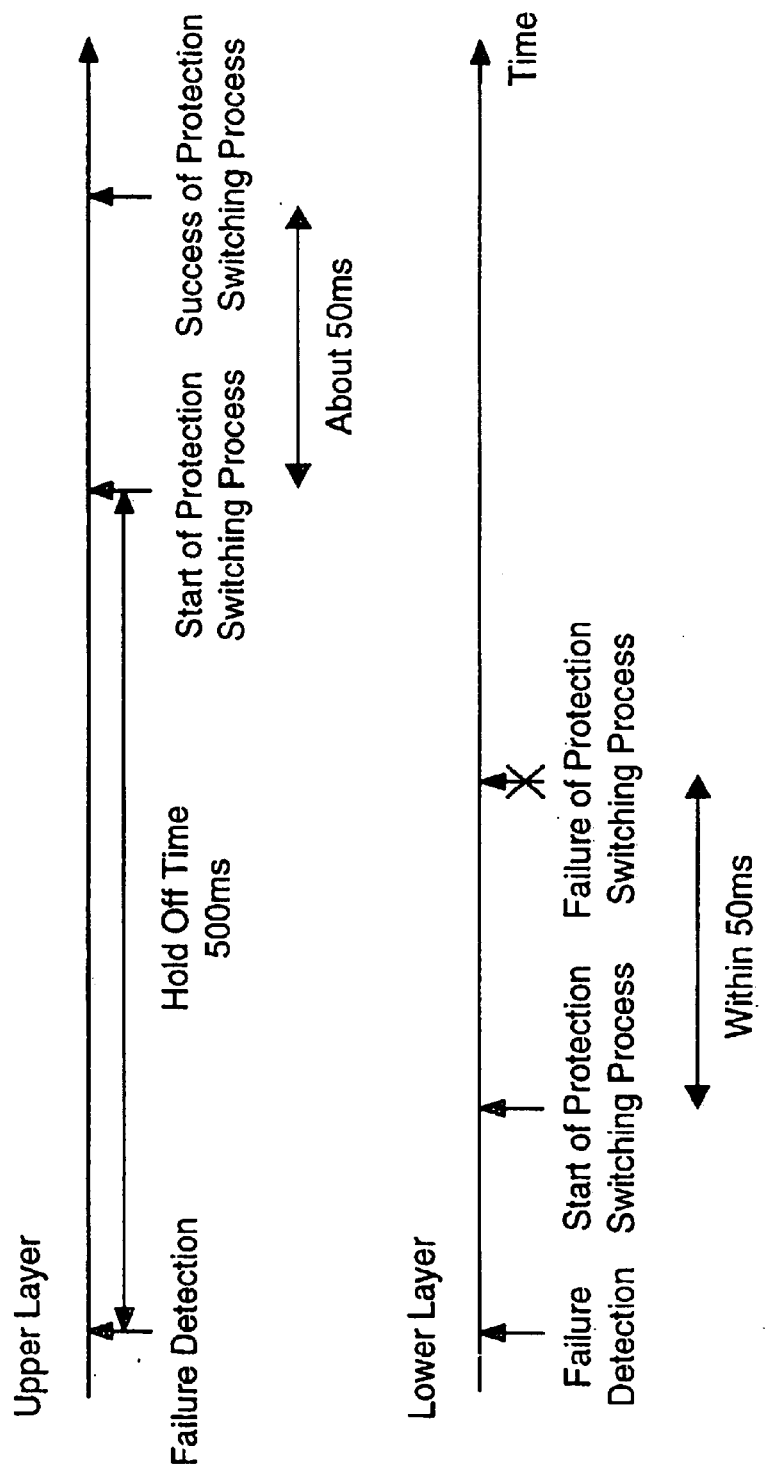
FIG. 7 is an illustration for describing an example for comparison with the embodiments of the present invention, and shown in this figure is a time chart of the switching in the lower and upper layers of the example.
Figure 15:
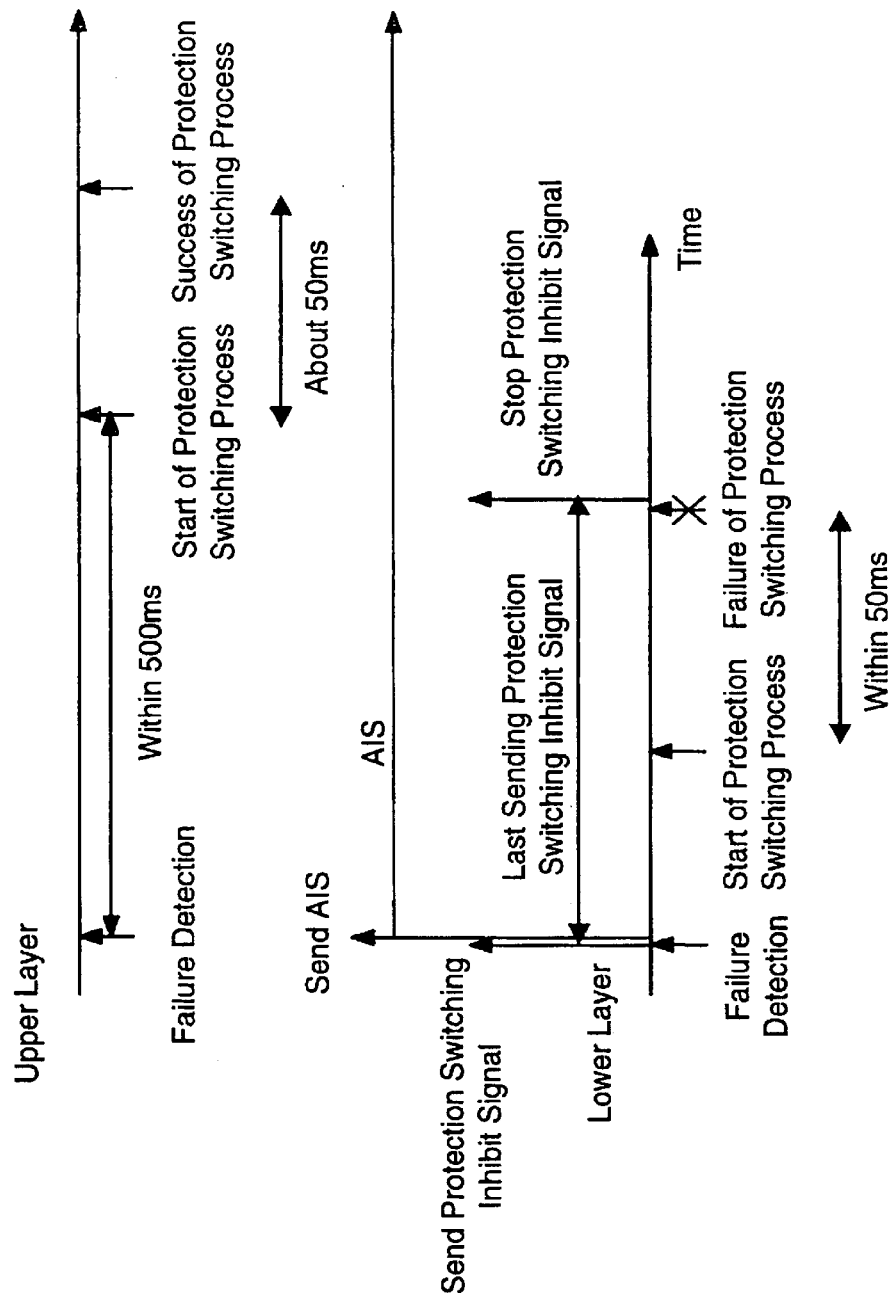
FIG. 15 is an illustration for describing an embodiment of the present invention, and shown in this figure is a time chart of the switching in the lower and upper layers.

In other words, by utilizing both the switching functions in accordance with the line conditions, the largest number of communication lines can be made available for the upper-layer apparatuses. Besides, the switching can be controlled so as to minimize the number of times of switching. In the case of switching in both the layers in particular, because switching takes place in the lower layer first and then in the upper layer, the switching is made securely, with less exchange of the protocol and high reliability. Besides, the total switching time in case that switching takes place in both the layers can be significantly reduced. FIG. 15 is a time chart of an embodiment of the present invention wherein the upper layer is an ATM network, its hold-off time being 500 msec, and the lower layer is a SONET, its switching-processing time being 50 msec. Although the switching in the two layers takes about 550 msec in case of the conventional method shown in FIG. 7, the switching in the two layers takes only 100 msec or so in case of the embodiment of the present invention.

Now, the arts in relation to the embodiments of the present invention will be recited below.

1. A communication apparatus which:
    is connected with a network comprising
        (i) lower-layer apparatuses which are connected with communication lines of a lower layer and communication lines of an upper layer and have means for line switching in the lower layer, and
        (ii) upper-layer apparatuses which are connected with the communication lines of the upper layer and have means for line switching in the upper layer; and
    detects line failure and coordinates line switching by the line-switching means of the lower- and upper-layer apparatuses by using failure information on the lower- and upper-layer communication lines.

2. A communication apparatus according to the above paragraph 1 wherein each lower-layer apparatus has a coordinated-switching device or a coordinated-switching function or is connected with coordinated-switching means through an interface.

3. A communication apparatus according to the above paragraph 1 having a switching mode that the line-switching means of the upper-layer apparatuses begin switching when the line switching means of the of the lower-layer apparatuses have finished switching.

4. A communication apparatus which:
    is connected with a network comprising
        (i) lower-layer apparatuses which are connected with communication lines of a lower layer and communication lines of an upper layer and have means for line switching in the lower layer, and
        (ii) upper-layer apparatuses which are connected with the communication lines of the upper layer and have means for line switching in the upper layer; and
    has means for
        (i) detecting line failure and determining the order of switching by the switching means of the lower- and upper-layer apparatuses by using failure information on the lower- and upper-layer communication lines, and
        (ii) restoring faulty communication lines.

5. A communication apparatus according to the above paragraph 4 wherein said means is the lower-layer apparatuses each of which has a coordinated-switching device or a coordinated-switching function or is connected with coordinated-switching means through an interface.

6. A communication apparatus which:
    is connected with a network comprising
        (i) lower-layer apparatuses which are connected with communication lines of a lower layer and communication lines of an upper layer and have means for line switching in the lower layer, and
        (ii) upper-layer apparatuses which are connected with the communication lines of the upper layer and have means for line switching in the upper layer;
    detects line failure and collects failure information on the lower- and upper-layer communication lines;
    identifies one or more faulty lines of the lower or the upper layer and locates the site of occurrence of failure by using the collected failure information;

identifies, by using the information on the faulty communication lines and the site of occurrence of failure, lower- and upper-layer apparatuses which are required to make line switching in order to restore the faulty communication lines; and has means for determining the order and the timing of line switching by the line-switching means of the identified lower- and upper-layer apparatuses.

7. A communication apparatus according to the above paragraph 6 wherein said means is the lower-layer apparatuses each of which has a coordinated-switching device or a coordinated-switching function or is connected with coordinated-switching means through an interface.

8. A communication apparatus which:

is connected with a network comprising
  (i) lower-layer apparatuses which are connected with communication lines of a lower layer and communication lines of an upper layer and have means for line switching in the lower layer, and
  (ii) upper-layer apparatuses which are connected with the communication lines of the upper layer and have means for line switching in the upper layer;
transmits a switching-inhibit signal to the upper-layer apparatuses when any lower-layer apparatus has detected line failure;
identifies faulty lines of the lower and upper layers and locates the site of occurrence of failure by using failure information collected on the lower- and upper-layer communication lines; and
coordinates line switching by the lower- and upper-layer apparatuses by using said collected failure information on the lower- and upper-layer communication lines.

9. A communication apparatus according to the above paragraph 8 wherein, in case that the lower-layer apparatuses have detected line failure, a switching-inhibit signal is transmitted to the upper-layer apparatuses first and then the failure detection is notified to them.

10. A communication apparatus according to the above paragraph 8 wherein each lower-layer apparatus has a coordinated-switching device or a coordinated-switching function or is connected with coordinated-switching means through an interface.

11. A communication apparatus which:

is connected with a network comprising
  (i) lower-layer apparatuses which are connected with communication lines of a lower layer and communication lines of an upper layer and have means for line switching in the lower layer, and
  (ii) upper-layer apparatuses which are connected with the communication lines of the upper layer and have means for line switching in the upper layer;
transmits a switching-inhibit signal to the upper-layer apparatuses when any lower-layer apparatus has detected line failure;
identifies one or more faulty lines of the lower or the upper layer and locates the site of occurrence of failure by using failure information collected on the lower- and upper-layer communication lines;
cancels the switching-inhibit signal to the upper-layer apparatuses when no lower-layer communication line has-been found faulty but any of the upper-layer communication lines has been found faulty;
determines, by using failure information on the lower- and upper-layer communication lines, which line-switching means of the lower- and upper-layer apparatuses should make switching in order to secure a largest number of normal upper-layer communication lines, or in order to restore high-priority lines rather than low-priority lines, or in order to secure a largest number of signal channels, in case that any of the lower-layer communication lines has been found faulty; and has means for causing line switching in the lower layer first and then canceling the switching-inhibit signal to the upper-layer apparatuses in case that switching is to take place in both the lower and upper layers in accordance with said determination.

12. A communication apparatus according to the above paragraph 11 wherein, in case that the lower-layer apparatuses have detected line failure, a switching-inhibit signal is transmitted to the upper-layer apparatuses first and then the failure detection is notified to them.

13. A communication apparatus according to the above paragraph 11 wherein each lower-layer apparatus has a coordinated-switching device or a coordinated-switching function or is connected with coordinated-switching means through an interface.

14. A communication system wherein:

provided are a first and a second upper-layer apparatus and a first, a second, a third, and a fourth lower-layer apparatus, each apparatus having line-switching means;
  (i) the first and second upper-layer apparatuses are connected to each other through a first and a second upper-layer communication line between which communication can be switched, (ii) the first and second lower-layer apparatuses are connected to each other through a first and a second lower-layer communication line between which communication can be switched, each lower-layer communication line being multiplexed to accommodate one or more upper-layer communication lines, (iii) the third and fourth lower-layer apparatuses are connected to each other through a third and a fourth lower-layer communication line between which communication can be switched, each lower-layer communication line being multiplexed to accommodate one or more upper-layer communication lines, (iv) the first upper-layer communication line connects the first upper-layer apparatus with the first lower-layer apparatus and the second upper-layer apparatus with the second lower-layer apparatus, and (v) the second upper-layer communication line connects the first upper-layer apparatus with the third lower-layer apparatus and the second upper-layer apparatus with the fourth lower-layer apparatus;
a switching-inhibit signal is transmitted to the upper-layer apparatuses when the lower-layer apparatuses have detected line failure;
one or more faulty lines of the lower or the upper layer are identified and the site of occurrence of failure is located by using failure information on the lower- and upper-layer communication lines;
the switching-inhibit signal to the upper-layer apparatuses is cancelled when no lower-layer communication line has been found faulty but any of the upper-layer communication lines has been found faulty;
which line-switching means of the lower- and upper-layer apparatuses should make switching is determined, based on failure information on the lower- and upper-layer communication lines, in order to secure a largest number of normal upper-layer communication lines, or in order to restore high-priority lines rather than low-priority lines, or in order to secure a largest number of signal channels, in case that any of the lower-layer communication lines has been found faulty; and provided is a first means for causing line switching in the lower layer first and then canceling the switching-inhibit signal to the upper-layer apparatuses, in case that switching is to take place in both the lower and upper layers in accordance with said determination.

15. A communication system according to the above paragraph 14 wherein said first means:

chooses a set of the line-switching means which has the smallest number of times of switching if two or more sets of line-switching means are found to bring about one and the same result for the proposition of securing a largest number of normal upper-layer communication lines, restoring high-priority lines rather than low-priority lines, or securing a largest number of signal channels;

chooses a set of line-switching means requiring no line switching in the lower layer, if any, and the switching-inhibit signal to the upper-layer apparatuses is cancelled if two or more sets of line-switching means are found to have one and the same smallest number of times of switching; and causes line switching in the lower layer first and then cancels the switching-inhibit signal to the upper-layer apparatuses if there is not a set of line-switching means which requires no line switching in the lower layer.

16. A communication system according to the above paragraph 14 wherein, in case that the lower-layer apparatuses have detected line failure, a switching-inhibit signal is transmitted to the upper-layer apparatuses first, and then the failure detection is notified to them.

17. A communication system wherein:

a plurality of lower-layer apparatuses and a plurality of upper-layer apparatuses are provided, the latter belonging to a layer which is upper than a layer to which the former belong, each apparatus having line-switching means;

connected between the lower-layer apparatuses are lower-layer communication lines, each lower-layer communication line being multiplexed to accommodate one or more upper-layer communication lines, and connected between the upper-layer apparatuses are upper-layer communication lines going through the lower-layer apparatuses;

a switching-inhibit signal is transmitted to the upper-layer apparatuses when any of the lower-layer apparatuses has detected line failure;

one or more faulty lines of the lower or the upper layer are identified and the site of occurrence of failure is located based on failure information on the lower- and upper-layer communication lines;

the switching-inhibit signal to the upper-layer apparatuses is cancelled when no lower-layer communication line has been found faulty but any of the upper-layer communication lines has been found faulty;

which line-switching means of the lower- and upper-layer apparatuses should make switching is determined, based on failure information on the lower- and upper-layer communication lines, in order to secure a largest number of normal upper-layer communication lines, or in order to restore high-priority lines rather than low-priority lines, or in order to secure a largest number of signal channels, in case that any of the lower-layer communication lines has been found faulty; and provided is a first means for causing line switching in the lower layer first and then canceling the switching-inhibit signal to the upper-layer apparatuses, in case that switching is to take place in both the lower and upper layers in accordance with said determination.

18. A communication system according to the above paragraph 17 wherein, in case that no lower-layer communication line has been found faulty but any of the upper-layer communication lines has been found faulty, the switching-inhibit signal to the upper-layer apparatuses is cancelled first and then the failure detection is notified to them.

19. A communication system wherein:

provided are a first and a second upper-layer apparatus and a first, a second, a third, and a fourth lower-layer apparatus, each apparatus having line-switching means;

(i) the first and second upper-layer apparatuses are connected to each other through a first and a second upper-layer communication line between which communication can be switched, (ii) the first and second lower-layer apparatuses are connected to each other through a first and a second lower-layer communication line between which communication can be switched, each lower-layer communication line being multiplexed to accommodate one or more upper-layer communication lines, (iii) the third and fourth lower-layer apparatuses are connected to each other through a third and a fourth lower-layer communication line between which communication can be switched, each lower-layer communication line being multiplexed to accommodate one or more upper-layer communication lines, (iv) the first upper-layer communication line connects the first upper-layer apparatus with the first lower-layer apparatus and the second upper-layer apparatus with the second lower-layer apparatus, and (v) the second upper-layer communication line connects the first upper-layer apparatus with the third lower-layer apparatus and the second upper-layer apparatus with the fourth lower-layer apparatus;

a switching-inhibit signal is transmitted to the upper-layer apparatuses when the lower-layer apparatuses have detected line failure;

faulty lines of the lower and upper layers are identified and the site of occurrence of failure is located based on failure information on the lower- and upper-layer communication lines;

the switching-inhibit signal to the upper-layer apparatuses is cancelled when no lower-layer communication line has been found faulty but any of the upper-layer communication lines has been found faulty; and provided is a first means for determining, based on failure information on the lower- and upper-layer communication lines, which line-switching means of the lower- and upper-layer apparatuses should make switching in order to secure a largest number of normal upper-layer communication lines, or in order to restore high-priority lines rather than low-priority lines, or in order to secure a largest number of signal channels, in case that any of the lower-layer communication lines has been found faulty.

20. A communication system according to the above paragraph 19 wherein, in case that switching is to take place in both the lower and upper layers in accordance with said determination, line switching is made in the lower layer first and then the switching-inhibit signal to the upper-layer apparatuses is cancelled.

21. A communication system according to the above paragraph 19 wherein said first means:
   chooses a set of the line-switching means which has the smallest number of times of switching if two or more sets of line-switching means are found to bring about one and the same result for the proposition of securing a largest number of normal upper-layer communication lines, restoring high-priority lines rather than low-priority lines, or securing a largest number of signal channels;
   chooses a set of line-switching means requiring no line switching in the lower layer, if any, and the switching-inhibit signal to the upper-layer apparatuses is cancelled if two or more sets of line-switching means are found to have one and the same smallest number of times of switching; and
   causes line switching in the lower layer first and then cancels the switching-inhibit signal to the upper-layer apparatuses if there is not a set of line-switching means which requires no line switching in the lower layer.

22. A communication system according to the above paragraph 19 wherein, in case that the lower-layer apparatuses have detected line failure, a switching-inhibit signal is transmitted to the upper-layer apparatuses first and then the failure detection is notified to them.

23. A communication system wherein:
   a plurality of lower-layer apparatuses and a plurality of upper-layer apparatuses are provided, the latter belonging to a layer which is upper than a layer to which the former belong, each apparatus having line-switching means;
   connected between the lower-layer apparatuses are lower-layer communication lines, each lower-layer communication line being multiplexed to accommodate one or more upper-layer communication lines, and connected between the upper-layer apparatuses are upper-layer communication lines going through the lower-layer apparatuses;
   a switching-inhibit signal is transmitted to the upper-layer apparatuses when any of the lower-layer apparatuses has detected line failure;
   one or more faulty lines of the lower or the upper layer are identified and the site of occurrence of failure is located based on failure information on the lower- and upper-layer communication lines;
   the switching-inhibit signal to the upper-layer apparatuses is cancelled when no lower-layer communication line has been found faulty but any of the upper-layer communication lines has been found faulty; and
   provided is a first means for determining, based on failure information on the lower- and upper-layer communication lines, which line-switching means of the lower- and upper-layer apparatuses should make switching in order to secure a largest number of normal upper-layer communication lines, or in order to restore high-priority lines rather than low-priority lines, or in order to secure a largest number of signal channels, in case that any of the lower-layer communication lines has been found faulty.

24. A communication system according to the above paragraph 23 wherein, in case that switching is to take place in both the lower and upper layers in accordance with said determination, line switching is made in the lower layer first and then the switching-inhibit signal to the upper-layer apparatuses is cancelled.

25. A communication system according to the above paragraph 23 wherein, in case that no lower-layer communication line has been found faulty but any of the upper-layer communication lines has been found faulty, the switching-inhibit signal to the upper-layer apparatuses is cancelled first and then the failure detection is notified to them.

26. A communication apparatus which:
   is connected with a network comprising
      (i) lower-layer apparatuses which are connected with communication lines of a lower layer and communication lines of an upper layer and have means for line switching in the lower layer, and
      (ii) upper-layer apparatuses which are connected with the communication lines of the upper layer and have means for line switching in the upper layer; and
   has means for giving an instruction to relevant upper-layer apparatuses in case that line failure can not partly or wholly be made good by line switching of relevant lower-layer apparatuses, the instruction requiring said relevant upper-layer apparatuses to make line switching to bypasses going around said relevant lower-layer apparatuses.

27. A communication apparatus according to the above paragraph 26 wherein each lower-layer apparatus has a coordinated-switching device or a coordinated-switching function or is connected with coordinated-switching means through an interface.

28. A communication apparatus which:
   is connected with a network comprising
      (i) lower-layer apparatuses which are connected with communication lines of a lower layer and communication lines of an upper layer and have means for line switching in the lower layer, and
      (ii) upper-layer apparatuses which are connected with the communication lines of the upper layer and have means for line switching in the upper layer;
   detects line failure and finds one or more faulty lines of the upper- or the lower-layer communication lines and the site of occurrence of failure based on failure information on the upper- and lower-layer communication lines;
   determines which upper- and lower-layer apparatuses should make line switching based on said information on faulty lines and the site of occurrence of failure and information on whether or not there are bypasses going around faulty lower-layer apparatuses, if any; and
   has means for giving an instruction to the relevant upper-layer apparatuses, in case that line failure can not partly or wholly be made good by line switching of relevant lower-layer apparatuses and there are bypasses going round said relevant lower-layer apparatuses, the instruction requiring said relevant upper-layer apparatuses to make line switching to said bypasses.

29. A communication apparatus according to the above paragraph 28 wherein each lower-layer apparatus has a coordinated-switching device or a coordinated-switching function or is connected with coordinated-switching means through an interface.

30. A communication apparatus according to the above paragraph 28 wherein said failure information on the upper-layer communication lines is collected from at least one of the upper-layer apparatus group and the lower-layer apparatus group.

31. A communication apparatus according to the above paragraph 28 wherein said instruction is to cancel the switching-inhibit signal to the upper-layer apparatuses.

32. A communication apparatus which:
is connected with a network comprising
(i) lower-layer apparatuses which are connected with communication lines of a lower layer and communication lines of an upper layer and have means for line switching in the lower layer, and
(ii) upper-layer apparatuses which are connected with the communication lines of the upper layer and have means for line switching in the upper layer;
detects line failure and, at the same time, finds one or more faulty lines of the upper- or the lower-layer communication lines and the site of occurrence of failure by using information on whether bypasses going around particular lower-layer apparatuses can be secured or not by line switching of relevant upper-layer apparatuses and failure information on the upper- and lower-layer communication lines;
determines which upper- and lower-layer apparatuses should make line switching based on said information on faulty lines and the site of occurrence of failure; and
has means for instructing the upper- and lower-layer apparatuses to make line switching in the lower layer first and then make line switching in the upper layer in case that line switching is required in both the upper and lower layers.

33. A communication apparatus according to the above paragraph 32 wherein each lower-layer apparatus has a coordinated-switching device or a coordinated-switching function or is connected with coordinated-switching means through an interface.

34. A communication system comprising:
(i) lower-layer apparatuses which are connected with communication lines of a lower layer and communication lines of an upper layer and have means for line switching in the lower layer and (ii) upper-layer apparatuses which are connected with the communication lines of the upper layer and have means for line switching in the upper layer; and
means for giving an instruction to relevant upper-layer apparatuses in case that line failure can not partly or wholly be made good by line switching of relevant lower-layer apparatuses, the instruction requiring said relevant upper-layer apparatuses to make line switching to bypasses going around said relevant lower-layer apparatuses.

35. A communication system according to the above paragraph 34 wherein each lower-layer apparatus has a coordinated-switching device or a coordinated-switching function or is connected with coordinated-switching means through an interface.

36. A communication system which:
has (i) lower-layer apparatuses which are connected with communication lines of a lower layer and communication lines of an upper layer and have means for line switching in the lower layer, and (ii) upper-layer apparatuses which are connected with the communication lines of the upper layer and have means for line switching in the upper layer;
detects line failure and finds one or more faulty lines of the upper- or the lower-layer communication lines and the site of occurrence of failure based on failure information on the upper- and lower-layer communication lines;
determines which upper- and lower-layer apparatuses should make line switching based on said information on faulty lines and the site of occurrence of failure and information on whether or not there are bypasses going around faulty lower-layer apparatuses, if any; and
has means for giving an instruction to relevant upper-layer apparatuses, in case that line failure can not partly or wholly be made good by line switching of relevant lower-layer apparatuses and there are bypasses going round said relevant lower-layer apparatuses, the instruction requiring said relevant upper-layer apparatuses to make line switching to said bypasses.

37. A communication system according to the above paragraph 36 wherein said failure information on the upper-layer communication lines is collected from at least one of the upper-layer apparatus group and the lower-layer apparatus group.

38. A communication system according to the above paragraph 36 wherein said instruction is to cancel the switching-inhibit signal to the upper-layer apparatuses.

39. A communication system which:
has (i) lower-layer apparatuses which are connected with communication lines of a lower layer and communication lines of an upper layer and have means for line switching in the lower layer, and (ii) upper-layer apparatuses which are connected with the communication lines of the upper layer and have means for line switching in the upper layer;
detects line failure and, at the same time, finds one or more faulty lines of the upper- or the lower-layer communication lines and the site of occurrence of failure by using information on whether bypasses going around particular lower-layer apparatuses can be secured or not by line switching of relevant upper-layer apparatuses and failure information on the upper- and lower-layer communication lines;
determines which upper- and lower-layer apparatuses should make line switching based on said information on faulty lines and the site of occurrence of failure; and
has means for instructing the upper- and lower-layer apparatuses to make line switching in the lower layer first and then make line switching in the upper layer in case that line switching is required in both the upper and lower layers.

In accordance with the present invention, line switching coordinated between the two layers can be made.

What is claimed is:
1. A communication apparatus which is connected with a network comprising:
(i) lower-layer apparatuses which are connected with communication lines of a lower layer and communication lines of an upper layer, each lower-layer apparatus having means for line switching in the lower layer;
(ii) upper-layer apparatuses which are connected with the communication lines of the upper layer and have means for line switching in the upper layer,
wherein said lower-layer apparatus transmits a switching-inhibit signal to the upper-layer apparatuses when said lower-layer apparatus has detected a line failure, in a lower or upper layer communication line identifies one or more faulty lines of the lower or the upper layer and locates the site of occurrence of failure by using failure information collected on the lower and upper-layer communication lines, cancels the switching-inhibit signal to the upper-layer apparatuses when no lower-layer communication line has been found faulty but an upper-layer communication line has been found faulty,; determines, by using failure information concerning the lower and upper-layer communication lines, which line-switching means of the lower and upper-layer apparatuses should perform switching in order to secure a largest number of normal upper-layer communication lines, or in order to restore high-priority lines rather than low-priority lines, or in order to secure a largest number of signal channels, in case that any of the lower-layer communication lines has been found faulty; and means for causing line switching in the lower layer first and then canceling the switching-inhibit signal to the upper-layer apparatuses when switching is to take place in both the lower and upper layers in accordance with said determination.

2. A communication system comprising:

first and second upper-layer apparatuses first, second, third, and fourth lower-layer apparatus, each apparatus having line switching means, (i) wherein the first and second upper-layer apparatuses are connected to each other through first and second upper-layer communication lines between which communication can be switched, (ii) the first and second lower-layer apparatuses are connected to each other through first and second lower-layer communication lines between which communication can be switched, each lower-layer communication line being multiplexed to accommodate one or more upper-layer communication lines, (iii) the third and fourth lower-layer apparatuses are connected to each other through third and fourth lower-layer communication line between which communication can be switched, each lower-layer communication line being multiplexed to accommodate one or more upper-layer communication lines, (iv) the first upper-layer communication line connects the first upper-layer apparatus with the first lower-layer apparatus and the second upper-layer apparatus with the second lower-layer apparatus, and (v) the second upper-layer communication line connects the first upper-layer apparatus with the third lower-layer apparatus and the second upper-layer apparatus with the fourth lower-layer apparatus, wherein a switching-inhibit signal is transmitted to the upper-layer apparatuses when the lower-layer apparatuses have detected a line failure, on said lower and upper layer communication lines, one or more faulty lines of the lower or the upper layer are identified and the site of occurrence of failure is located by using failure information on the lower and upper-layer communication lines, the switching-inhibit signal to the upper-layer apparatuses is cancelled when no lower-layer communication line has been found faulty but as upper-layer communication line has been found faulty, whether line-switching means of the lower and upper-layer apparatuses should perform switching is determined, based on failure information on the lower and upper-layer communication lines, in order to secure a largest number of normal upper-layer communication lines, or in order to restore high-priority lines rather than low-priority lines, or in order to secure a largest number of signal channels, in case that any of the lower-layer communication lines has been found faulty; and first means for causing line switching in the lower layer first and then canceling the switching-inhibit signal to the upper-layer apparatuses, when switching is to take place in both the lower and upper layers in accordance with said determination.

3. A communication system according to claim 2 wherein said first means:

chooses a set of the line-switching means which has the smallest number of times of switching if two or more sets of line-switching means are found to bring about one and the same result for the proposition of securing a largest number of normal upper-layer communication lines, restoring high-priority lines rather than low-priority lines, or securing a largest number of signal channels, chooses a set of line-switching means requiring no line switching in the lower layer, if any, and the switching-inhibit signal to the upper-layer apparatuses is cancelled if two or more sets of line-switching means are found to have one and the same smallest number of times of switching, and causes line switching in the lower layer first and then cancels the switching-inhibit signal to the upper-layer apparatuses if there is not a set of line-switching means which requires no line switching in the lower layer.

4. A communication system comprising:

a plurality of lower-layer apparatuses;

a plurality of upper-layer apparatuses which belong to a layer which is upper than a layer to which the lower-layer apparatuses belong, wherein each apparatus has line-switching means, wherein connected between the lower-layer apparatuses are lower-layer communication lines, each lower-layer communication line being multiplexed to accommodate one or more upper-layer communication lines, and connected between the upper-layer apparatuses are upper-layer communication lines going through the lower-layer apparatuses, a switching-inhibit signal is transmitted to the upper-layer apparatuses when any of the lower-layer apparatuses has detected line failure, on said lower and upper layer communication lines, one or more faulty lines of the lower or the upper layer are identified and the site of occurrence of failure is located based on failure information on the lower and upper-layer communication lines, the switching-inhibit signal to the upper-layer apparatuses is cancelled when no lower-layer communication line has been found faulty but an upper-layer communication line has been found faulty, whether line-switching means of the lower and upper-layer apparatuses should perform switching is determined, based on failure information on the lower and upper-layer communication lines, in order to secure a largest number of normal upper-layer communication lines, or in order to restore high-priority lines rather than low-priority lines, or in order to secure a largest number of signal channels, any of the lower-layer communication lines has been found faulty; and first means for causing line switching in the lower layer first and then canceling the switching-inhibit signal to the upper-layer apparatuses, when switching is to take place in both the lower and upper layers in accordance with said determination.

5. A communication system comprising:

first and second upper-layer apparatuses; first, second, third, and fourth lower-layer apparatuses, wherein each apparatus has line-switching means, (i) wherein the first and second upper-layer apparatuses are connected to each other through first and second upper-layer communication line between which communication can be switched, (ii) the first and second lower-layer apparatuses are connected to each other through first and second lower-layer communication lines between which communication can be switched, each lower-layer communication line being multiplexed to accommodate one or more upper-layer communication lines, (iii) the third and fourth lower-layer apparatuses are connected to each other through third and fourth lower-layer communication lines between which communication can be switched, each lower-layer communication line being multiplexed to accommodate one or more upper-layer communication lines, (iv) the first upper-layer communication line connects the first upper-layer apparatus with the first lower-layer apparatus and the second upper-layer apparatus with the second lower-layer apparatus, and (v) the second upper-layer communication line connects the first upper-layer apparatus with the third lower-layer apparatus and the second upper-layer apparatus with the fourth lower-layer apparatus, wherein a switching-inhibit signal is transmitted to the upper-layer apparatuses when the lower-layer apparatuses have detected a line failure, on said lower and upper layer communication lines, faulty lines of the lower and upper layers are identified and the site of occurrence of failure is located based on failure information on the lower- and upper-layer communication lines, and the switching-inhibit signal to the upper-layer apparatuses is cancelled when no lower-layer communication line has been found faulty but upper-layer communication line has been found faulty; and first means for determining, based on failure information on the lower and upper-layer communication lines, which line-switching means of the lower and upper-layer apparatuses should perform switching in order to secure a largest number of normal upper-layer communication lines, or in order to restore high-priority lines rather than low-priority lines, or in order to secure a largest number of signal channels, in case that any-of the lower-layer communication lines has been found faulty.

6. A communication system comprising:

a plurality of lower-layer apparatuses;

a plurality of upper-layer apparatuses which to a layer which is upper than a layer to which the lower-layer apparatus belong, wherein each apparatus has line switching means, wherein connected between the lower-layer apparatuses are lower-layer communication lines, each lower-layer communication line being multiplexed to accommodate one or more upper-layer communication lines, and connected between the upper-layer apparatuses are upper-layer communication lines going through the lower-layer apparatuses, a switching-inhibit signal is transmitted to the upper-layer apparatuses when any of the lower-layer apparatuses has detected a line failure, on said lower and upper layer communication lines, one or more faulty lines of the lower or the upper layer are identified and the site of occurrence of failure is located based on failure information on the lower and upper-layer communication lines, and the switching-inhibit signal to the upper-layer apparatuses is cancelled when no lower-layer communication line has been found faulty but any of the upper-layer communication lines has been found faulty; and first means for determining, based on failure information on the lower and upper-layer communication lines, which line-switching means of the lower- and upper-layer apparatuses should perform switching in order to secure a largest number of normal upper-layer communication lines, or in order to restore high-priority lines rather than low-priority lines, or in order to secure a largest number of signal channels, in case that any of the lower-layer communication lines has been found faulty.

\* \* \* \* \*